US012719867B2

(12) United States Patent
Zhang et al.

(10) Patent No.: US 12,719,867 B2
(45) Date of Patent: Aug. 25, 2026

(54) METHOD AND APPARATUS FOR SELECTING AN AUTHENTICATION TYPE FOR AUTHENTICATION RELATED TO A TERMINAL DEVICE

(71) Applicant: Telefonaktiebolaget LM Ericsson (publ), Stockholm (SE)

(72) Inventors: Wen Zhang, Shanghai (CN); Tianmei Liang, Shanghai (CN); Juying Gan, Shanghai (CN); Gang Ren, Shanghai (CN); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 18/278,309

(22) PCT Filed: Feb. 23, 2022

(86) PCT No.: PCT/CN2022/077469

§ 371 (c)(1),
(2) Date: Aug. 22, 2023

(87) PCT Pub. No.: WO2022/179525

PCT Pub. Date: Sep. 1, 2022

(65) Prior Publication Data

US 2024/0129312 A1 Apr. 18, 2024

(51) Int. Cl.
*H04L 9/40* (2022.01)

(52) U.S. Cl.
CPC ........ *H04L 63/0892* (2013.01); *H04L 63/102* (2013.01); *H04L 63/20* (2013.01)

(58) Field of Classification Search
CPC .... H04L 63/0892; H04L 63/102; H04L 63/20
See application file for complete search history.

(56) References Cited

U.S. PATENT DOCUMENTS 10,158,489 B2 * 12/2018 Shastri ................ H04L 63/0853
10,491,376 B1 * 11/2019 Suthar ................... H04L 63/102
(Continued)

FOREIGN PATENT DOCUMENTS

CN 103067342 A 4/2013
CN 109391940 A 2/2019
(Continued)

OTHER PUBLICATIONS

Notice of Reasons for Refusal for Japanese Patent Application No. 2023-550687, mailed Sep. 13, 2024, 10 pages.
(Continued)

*Primary Examiner* — Jason Chiang
(74) *Attorney, Agent, or Firm* — Withrow & Terranova, PLLC

(57) ABSTRACT

Embodiments of the present disclosure provide method and apparatus for authentication. A method performed by a session management and gateway entity comprises receiving a create session request comprising an identity of a terminal device from a mobile management entity. The method further comprises determining to use a second authentication method rather than a first authentication method. The second authentication method has a higher security than the first authentication method. The method further comprises triggering a procedure of the second authentication method related to an authentication authorization and accounting (AAA) server.

22 Claims, 17 Drawing Sheets

(56) References Cited

U.S. PATENT DOCUMENTS 11,057,775 B2* 7/2021 Zhang ........ H04W 12/10
11,271,937 B2* 3/2022 Wang ........ H04L 63/0884
11,675,946 B1* 6/2023 Waters ........ G06F 30/331 703/23
2004/0117662 A1* 6/2004 Ong ........ G06F 21/41 726/5
2006/0053296 A1* 3/2006 Busboom ........ H04L 63/20 726/4
2008/0256082 A1* 10/2008 Davies ........ G06F 16/2471
2008/0311906 A1* 12/2008 Suh ........ H04L 63/162 455/435.1
2009/0094372 A1* 4/2009 Nyang ........ H04L 63/168 709/229
2011/0176531 A1* 7/2011 Rune ........ H04W 76/22 370/338
2011/0261787 A1* 10/2011 Bachmann ........ H04W 12/037 370/331
2013/0088956 A1* 4/2013 Zhou ........ H04W 28/02 370/230
2014/0074932 A1* 3/2014 Mihara ........ H04L 67/06 709/204
2014/0256291 A1 9/2014 Zhou et al.
2015/0365414 A1* 12/2015 Liang ........ H04W 12/069 726/7
2016/0373589 A1* 12/2016 Chai ........ H04M 15/66
2017/0078333 A1* 3/2017 Tevlin ........ H04W 12/069
2018/0227743 A1* 8/2018 Faccin ........ H04W 8/08
2018/0337907 A1* 11/2018 Bhansali ........ H04L 9/3231
2019/0014096 A1* 1/2019 Hancock ........ H04L 9/3263
2019/0090164 A1* 3/2019 Ding ........ H04W 76/11
2019/0215691 A1* 7/2019 Salkintzis ........ H04W 12/069
2020/0068391 A1* 2/2020 Liu ........ H04W 12/06
2020/0128433 A1 4/2020 Jeong et al.
2020/0128614 A1* 4/2020 Ying ........ H04W 48/16
2020/0146077 A1* 5/2020 Li ........ H04W 76/10
2020/0153871 A1* 5/2020 Lei ........ H04W 12/06
2020/0163012 A1* 5/2020 Zhu ........ H04W 12/06
2020/0187277 A1* 6/2020 Lee ........ H04W 76/12
2020/0221541 A1* 7/2020 Yan ........ H04M 15/66
2020/0260336 A1* 8/2020 Wu ........ H04W 36/0044
2020/0267223 A1* 8/2020 Baek ........ H04L 67/53
2020/0322776 A1* 10/2020 Pazhyannur ........ H04W 12/06
2020/0374350 A1* 11/2020 Zhu ........ H04W 76/18
2021/0006345 A1* 1/2021 Zhu ........ H04W 76/12
2021/0058780 A1* 2/2021 Yu ........ H04W 12/08
2021/0076444 A1* 3/2021 Shu ........ H04W 76/25
2021/0112127 A1* 4/2021 Zhu ........ H04L 69/321
2021/0160936 A1* 5/2021 Yang ........ H04W 76/12
2021/0168594 A1* 6/2021 Wu ........ H04W 88/16
2021/0185035 A1* 6/2021 Fernandez Yu ........ G06F 16/2379
2021/0185524 A1* 6/2021 Wu ........ H04W 12/043
2021/0306334 A1* 9/2021 Han ........ H04L 63/0884
2021/0321258 A1* 10/2021 Salkintzis ........ H04W 12/06
2022/0004416 A1* 1/2022 Ilic ........ G06F 9/45558
2022/0094546 A1* 3/2022 Ying ........ H04L 9/30
2022/0141751 A1* 5/2022 Yao ........ H04W 28/0861 370/331
2022/0191090 A1* 6/2022 Lee ........ H04L 67/04
2022/0272620 A1* 8/2022 Ninglekhu ........ H04W 40/02
2022/0279348 A1* 9/2022 Youn ........ H04W 12/06
2022/0369363 A1* 11/2022 Ferdi ........ H04W 4/44
2023/0077354 A1* 3/2023 Moon ........ H04W 28/0268 370/235
2023/0142879 A1* 5/2023 Godin ........ H04W 24/02 370/329
2023/0164534 A1* 5/2023 Muñoz De La Torre Alonso ........ H04W 8/005 370/329
2023/0189132 A1* 6/2023 Kim ........ H04W 48/18 455/435.1
2023/0217241 A1* 7/2023 Velev ........ H04W 8/20 455/414.1
2023/0224704 A1* 7/2023 Atarius ........ H04L 9/3239 726/6
2023/0247423 A1* 8/2023 Kunz ........ H04W 12/06 455/410
2023/0262455 A1* 8/2023 Salkintzis ........ H04L 63/08 726/6
2023/0276306 A1* 8/2023 Jimenez Cordon ........ H04W 76/10 370/331
2023/0345310 A1* 10/2023 Li ........ H04W 4/06
2023/0363019 A1* 11/2023 Hong ........ H04W 76/12
2024/0107593 A1* 3/2024 Rönneke ........ H04W 76/10

FOREIGN PATENT DOCUMENTS

CN 110235423 A 9/2019
JP 2014532381 A 12/2014
JP 2017535989 A 11/2017
JP 2019533951 A 11/2019
WO 2020067112 A1 4/2020

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.9.0, Dec. 2020, 3GPP Organizational Partners, 440 pages.

Author Unknown, "Technical Specification Group Services and System Aspects; System architecture for the 5G System (5GS); Stage 2 (Release 16)," Technical Specification 23.501, Version 16.7.0, Dec. 2020, 3GPP Organizational Partners, 450 pages.

Author Unknown, "Technical Specification Group Services and System Aspects; System architecture for the 5G System (5GS); Stage 2 (Release 17)," Technical Specification 23.501, Version 17.0.0, Mar. 2021, 3GPP Organizational Partners, 489 pages.

Author Unknown, "Technical Specification Group Services and System Aspects; Procedures for the 5G System (5GS); Stage 2 (Release 16)," Technical Specification 23.502, Version 16.7.1, Jan. 2021, 3GPP Organizational Partners, 603 pages.

Author Unknown, "Technical Specification Group Services and System Aspects; Procedures for the 5G System (5GS); Stage 2 (Release 17)," Technical Specification 23.502, Version 17.0.0, Mar. 2021, 3GPP Organizational Partners, 646 pages.

Author Unknown, "Technical Specification Group Core Network and Terminals; Interworking between the Public and Mobile Network (PLMN) supporting packet based services and Packet Data Networks (PDN) (Release 17)," Technical Specification 29.061, Version 17.1.0, Dec. 2020, 3GPP Organizational Partners, 175 pages.

Author Unknown, "Technical Specification Group Core Network and Terminals; 5G System; Interworking between 5G Network and external Data Networks; Stage 3 (Release 17)," Technical Specification 29.561, Version 17.0.0, Dec. 2020, 3GPP Organizational Partners, 71 pages.

Author Unknown, "Technical Specification Group Services and System Aspects; Security architecture and procedures for 5G system (Release 17)," Technical Specification 33.501, Version 17.0.0, Dec. 2020, 3GPP Organizational Partners, 253 pages.

Ericsson, "C3-205345: Discussion on 5GS and EPS interworking support with DN-AAA server," 3GPP TSG-CT WG3 Meeting #112e, Nov. 4-13, 2020, 1 page.

Nokia, et al., "S2-2100105: Secondary AUTH for 5GS interworking with EPS," 3GPP SA WG2 Meeting #143e, Feb. 24-Mar. 9, 2021, Electronic Meeting, 5 pages.

International Search Report and Written Opinion for International Patent Application No. PCT/CN2022/077469, mailed May 12, 2022, 9 pages.

Decision of Refusal for Japanese Patent Application No. 2023-550687, mailed Mar. 14, 2025, 5 pages.

Author Unknown, "Technical Specification Group Services and System Aspects; Procedures for the 5G System (5GS); Stage 2

(56) References Cited

OTHER PUBLICATIONS (Release 16)," Technical Specification 23.502, Version 16.4.0, Mar. 2020, 3GPP Organizational Partners, 582 pages.
Extended European Search Report for European Patent Application No. 22758889.4, mailed Oct. 31, 2024, 12 pages.
Decision to Grant for Japanese Patent Application No. 2023-550687, mailed Oct. 14, 2025, 6 pages.

* cited by examiner

NRF
UDM
PCF
CHF
BS
N27
N10
N7
N40
Offline
CDR
AMF
N11
also
(N1 + N2)
PGW-C+SMF
DN-AAA
Shared Server
N4
gNB
N3
S5-C
MME
SGW-C
S11
PGW-U+UPF
DN
N6
Sx
N6
eNB
SGW-U
S1-U
S5-U
DN-AAA
Inband Server

Figure 6B:
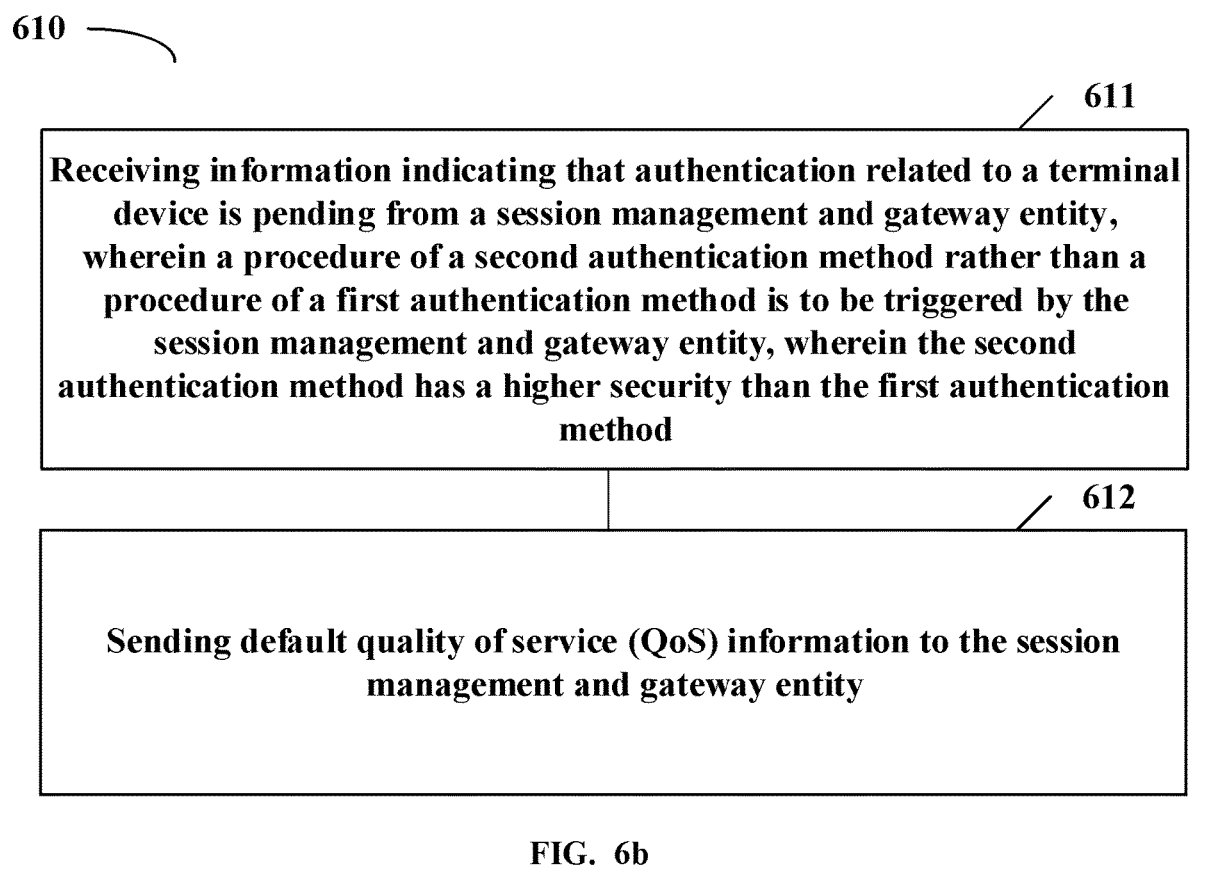

610

611

Receiving information indicating that authentication related to a terminal device is pending from a session management and gateway entity, wherein a procedure of a second authentication method rather than a procedure of a first authentication method is to be triggered by the session management and gateway entity, wherein the second authentication method has a higher security than the first authentication method

612

Sending default quality of service (QoS) information to the session management and gateway entity

Figure 6C:
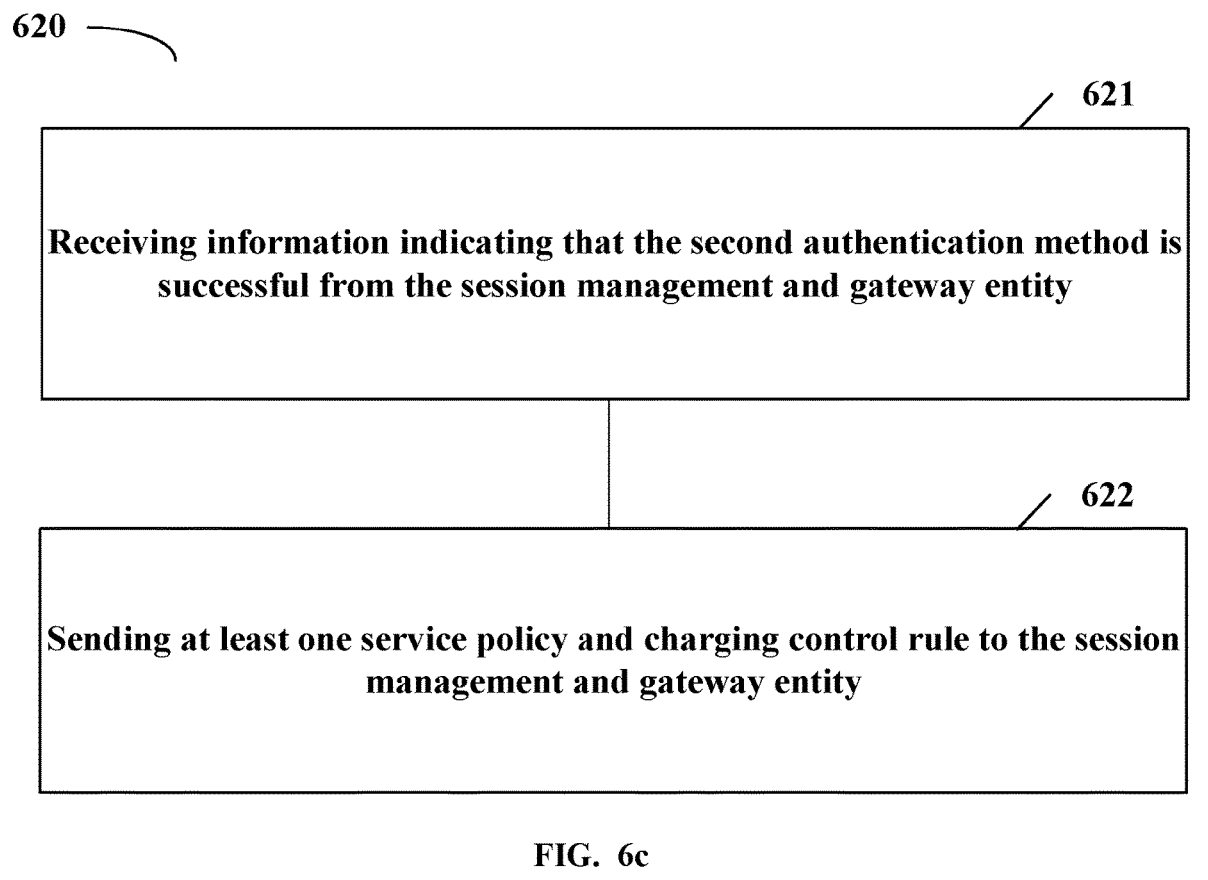

Receiving information indicating that the second authentication method is successful from the session management and gateway entity

622

Sending at least one service policy and charging control rule to the session management and gateway entity

Figure 6D:
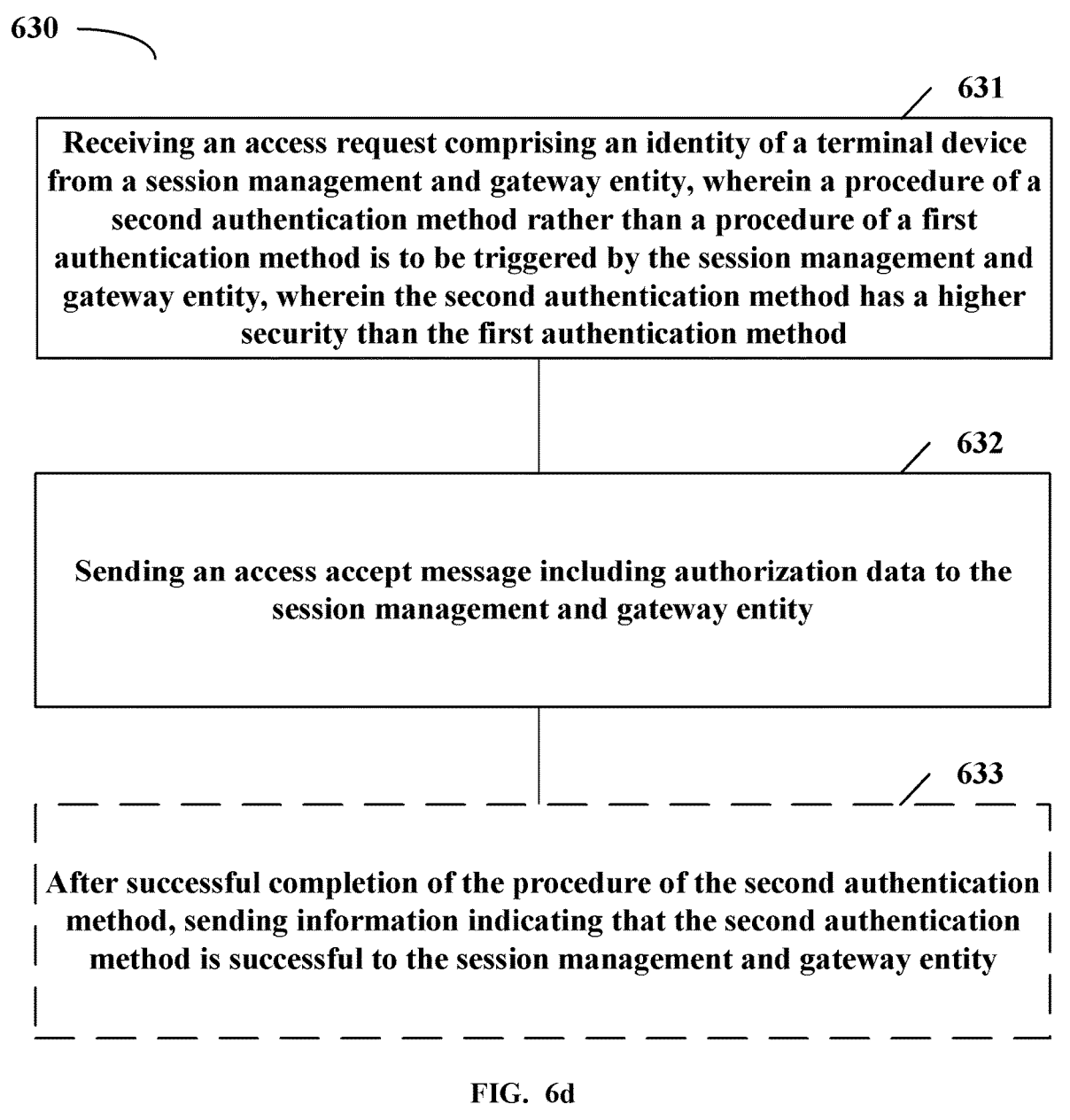

Receiving an access request comprising an identity of a terminal device from a session management and gateway entity, wherein a procedure of a second authentication method rather than a procedure of a first authentication method is to be triggered by the session management and gateway entity, wherein the second authentication method has a higher security than the first authentication method

632

Sending an access accept message including authorization data to the session management and gateway entity

633

After successful completion of the procedure of the second authentication method, sending information indicating that the second authentication method is successful to the session management and gateway entity

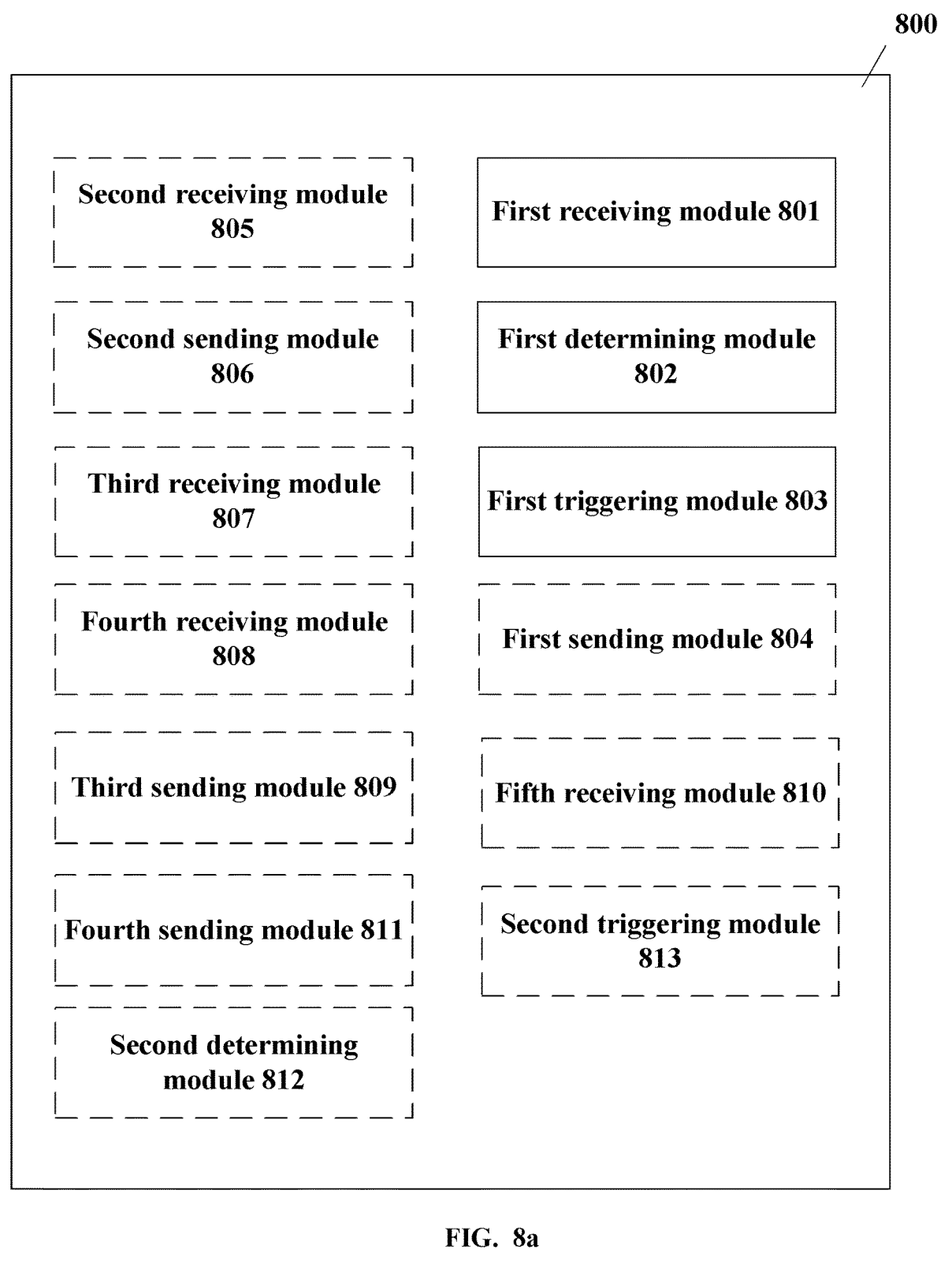

Second receiving module 805

First receiving module 801

Second sending module 806

First determining module 802

Third receiving module 807

First triggering module 803

Fourth receiving module 808

First sending module 804

Third sending module 809

Fifth receiving module 810

Fourth sending module 811

Second triggering module 813

Second determining module 812

FIG. 8a

METHOD AND APPARATUS FOR SELECTING AN AUTHENTICATION TYPE FOR AUTHENTICATION RELATED TO A TERMINAL DEVICE

This application is a 35 U.S.C. § 371 national phase filing of International Application No. PCT/CN2022/077469, filed Feb. 23, 2022, which claims the benefit of International Application No. PCT/CN2021/077462, filed Feb. 23, 2021, the disclosures of which are incorporated herein by reference in their entireties.

TECHNICAL FIELD

The non-limiting and exemplary embodiments of the present disclosure generally relate to the technical field of communications, and specifically to methods and apparatuses for authentication.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing various network function services for various communication networks.

In the wireless communication networks, there may be various authentication, authorization and accounting (AAA) procedures. For example, clause 16 of 3GPP TS 29.061 V17.1.0, the disclosure of which is incorporated by reference herein in its entirety, describes the Usage of RADIUS (Remote Authentication Dial In User Service) on Gi/Sgi interface. Clause 12 of 3GPP TS 29.561 V17.0.0, the disclosure of which is incorporated by reference herein in its entirety, describes the interworking with DN (data network)-AAA (Diameter).

According to clause 5.6.6 of 3GPP TS 23.501 V16.7.0, the disclosure of which is incorporated by reference herein in its entirety, secondary authentication/authorization by a DN-AAA server is only defined during PDU (protocol data unit) Session Establishment. If a UE (user equipment) provides authentication/authorization information corresponding to a DN-specific identity during the Establishment of the PDU Session, and the SMF (Session Management Function) determines that authentication/authorization of the PDU Session Establishment is required based on the SMF policy associated with the DN.

Extensible Authentication Protocol (EAP) authentication is mandatory for 5GC (5G core network) because EAP has a higher security than legacy password authentication protocol (PAP) or challenge handshake authentication protocol (CHAP) (user-name and user password from PCO (Protocol Configuration Options)).

The legacy PAP/CHAP (user-name and user-password come from PCO) is still used for 4G PDN (Packet Data Network) connection setup (including the 4G user which has the 5G capability). EAP based authentication is not defined for 4G PDN connection.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There may be some security problems when an authentication method with a lower security is used in the communication network. For example, the security problems would happen when the UE attaches to EPS (Evolved Packet System). The UE uses the legacy PAP/CHAP (user-name and user-password from PCO) during PDN connection setup. The raw data without any security is transferred in PCO or ePCO (Extended Protocol Configuration Options).

In order to provide the higher security in the communication network, it may be desirable to provide a solution to support the authentication method with a higher security. For example, in order to give the higher security for 4G PDN connection, it may be desirable to define a solution to support EAP for 4G PDN connection in EPS. When EAP based authentication is supported for 4G PDN connection, it doesn't need to do re-authentication when mobility from 4G to 5G.

In a first aspect of the disclosure, there is provided a method performed by a session management and gateway entity. The method comprises receiving a create session request comprising an identity of a terminal device from a mobile management entity. The method further comprises determining to use a second authentication method rather than a first authentication method. The second authentication method has a higher security than the first authentication method. The method further comprises triggering a procedure of the second authentication method related to an authentication authorization and accounting (AAA) server.

In an embodiment, the method further comprises sending an access request comprising the identity of the terminal device to the AAA server. The method further comprises receiving an access accept message including authorization data from the AAA server.

In an embodiment, the access request further comprises a void user name or a local configured user name.

In an embodiment, the method further comprises sending information indicating that authentication related to the terminal device is pending to a policy control function. The method further comprises receiving default quality of service (QoS) information from the policy control function.

In an embodiment, the procedure of the second authentication method is trigged after the session is successfully setup.

In an embodiment, the method further comprises receiving information indicating that the second authentication method is successful from the AAA server. The method further comprises sending information indicating that the second authentication method is successful to the policy control function. The method further comprises receiving at least one service policy and charging control rule from the policy control function.

In an embodiment, the method further comprises sending a message comprising the information indicating that the second authentication method is successful and quality of service (QoS) information to the mobile management entity.

In an embodiment, during the procedure of the second authentication method, at least one update bearer request and at least one update bearer response including Extended Protocol Configuration Options (ePCO) with extensible authentication protocol (EAP) message exchange are used between the session management and gateway entity and the mobile management entity.

In an embodiment, the method further comprises determining that the second authentication method is failed. The method further comprises triggering a session deletion procedure.

In an embodiment, determining that the second authentication method is failed is based on at least of receiving information indicating that the second authentication method is failed from the AAA server; or an update bearer response from the mobile management entity is failed or timeout.

In an embodiment, the second authentication method comprises extensible authentication protocol (EAP).

In an embodiment, the first authentication method comprises password authentication protocol (PAP) or challenge handshake authentication protocol (CHAP).

In an embodiment, determining to use the second authentication method rather than the first authentication method is based on at least one of an agreement with the AAA server; at least one parameter comprised in the create session request; a local configuration of whether the second authentication method should be used; capability of the AAA server; or capability of the terminal device.

In an embodiment, the agreement with the AAA server comprises an agreement with the AAA server for a specific data network name (DNN) or single network slice selection assistance information (S-NSSAI).

In an embodiment, the session management and gateway entity comprises session management function combined with packet data network gateway control plane (SMF+PGW-C).

In an embodiment, the AAA server comprises data network AAA (DN-AAA) server.

In an embodiment, the terminal device is accessing a fourth generation (4G) network.

In an embodiment, the create session request excludes a real user name and a user password specific to a data network name.

In a second aspect of the disclosure, there is provided a method performed by a mobile management entity. The method comprises receiving an attach request from a terminal device. The method further comprises sending a create session request comprising an identity of the terminal device to a session management and gateway entity. A procedure of a second authentication method rather than a procedure of a first authentication method is to be triggered by the session management and gateway entity. The second authentication method has a higher security than the first authentication method.

In an embodiment, the method further comprises receiving a message comprising information indicating that the second authentication method is successful and quality of service (QoS) information from the session management and gateway entity. The method further comprises sending a message comprising information indicating that the second authentication method is successful to the terminal device.

In an embodiment, during the procedure of the second authentication method, at least one modify Evolved Packet System (EPS) bearer context request and at least one modify EPS bearer context accept including Extended Protocol Configuration Options (ePCO) with extensible authentication protocol (EAP) message exchange are used between the terminal device and the mobile management entity.

In an embodiment, the attach request excludes a real user name and a user password specific to a data network name.

In a third aspect of the disclosure, there is provided a method performed by a terminal device. The method comprises sending an attach request to a mobile management entity. A procedure of a second authentication method rather than a procedure of a first authentication method is to be triggered by a session management and gateway entity. The second authentication method has a higher security than the first authentication method.

In an embodiment, the method further comprises receiving a message comprising information indicating that the second authentication method is successful from the mobile management entity.

In a fourth aspect of the disclosure, there is provided a method performed by a policy control function. The method comprises receiving information indicating that authentication related to a terminal device is pending from a session management and gateway entity. The method further comprises sending default quality of service (QoS) information to the session management and gateway entity. A procedure of a second authentication method rather than a procedure of a first authentication method is to be triggered by the session management and gateway entity. The second authentication method has a higher security than the first authentication method.

In an embodiment, the method further comprises receiving information indicating that the second authentication method is successful from the session management and gateway entity. The method further comprises sending at least one service policy and charging control rule to the session management and gateway entity.

In a fifth aspect of the disclosure, there is provided a method performed by an authentication authorization and accounting (AAA) server. The method comprises receiving an access request comprising an identity of a terminal device from a session management and gateway entity. The method further comprises sending an access accept message including authorization data to the session management and gateway entity. A procedure of a second authentication method rather than a procedure of a first authentication method is to be triggered by the session management and gateway entity. The second authentication method has a higher security than the first authentication method.

In an embodiment, the method further comprises: after successful completion of the procedure of the second authentication method, sending information indicating that the second authentication method is successful to the session management and gateway entity.

In an embodiment, the method further comprises determining that the procedure of the second authentication method is not started after a period. The method further comprises sending a disconnect request to the session management and gateway entity.

In a sixth aspect of the disclosure, there is provided a session management and gateway entity. The session management and gateway entity comprises a processor and a memory coupled to the processor. Said memory contains instructions executable by said processor. Said session management and gateway entity is operative to receive a create session request comprising an identity of a terminal device from a mobile management entity. Said session management and gateway entity is further operative to determine to use a second authentication method rather than a first authentication method. The second authentication method has a higher security than the first authentication method. Said session management and gateway entity is further operative to trigger a procedure of the second authentication method related to an authentication authorization and accounting (AAA) server.

In a seventh aspect of the disclosure, there is provided a mobile management entity. The mobile management entity comprises a processor and a memory coupled to the processor. Said memory contains instructions executable by said processor. Said mobile management entity is operative to receive an attach request from a terminal device. Said mobile management entity is further operative to send a create session request comprising an identity of the terminal device to a session management and gateway entity. A procedure of a second authentication method rather than a procedure of a first authentication method is to be triggered by the session management and gateway entity. The second authentication method has a higher security than the first authentication method.

In an eighth aspect of the disclosure, there is provided a terminal device. The terminal device comprises a processor and a memory coupled to the processor. Said memory contains instructions executable by said processor. Said terminal device is operative to send an attach request to a mobile management entity. A procedure of a second authentication method rather than a procedure of a first authentication method is to be triggered by a session management and gateway entity. The second authentication method has a higher security than the first authentication method.

In a ninth aspect of the disclosure, there is provided a policy control function. The policy control function comprises a processor and a memory coupled to the processor. Said memory contains instructions executable by said processor. Said policy control function is operative to receive information indicating that authentication related to a terminal device is pending from a session management and gateway entity. Said policy control function is further operative to send default quality of service (QoS) information to the session management and gateway entity. A procedure of a second authentication method rather than a procedure of a first authentication method is to be triggered by the session management and gateway entity. The second authentication method has a higher security than the first authentication method.

In a tenth aspect of the disclosure, there is provided an authentication authorization and accounting (AAA) server. The AAA server comprises a processor and a memory coupled to the processor. Said memory contains instructions executable by said processor. S an access accept message including authorization data to the session management and gateway entity. A procedure of a second authentication method rather than a procedure of a first authentication method is to be triggered by the session management and gateway entity. The second authentication method has a higher security than the first authentication method.

In an eleventh aspect of the disclosure, there is provided a session management and gateway entity. The session management and gateway entity comprises a first receiving module, a first determining module and a first triggering module. The first receiving module may be configured to receive a create session request comprising an identity of a terminal device from a mobile management entity. The first determining module may be configured to determining to use a second authentication method rather than a first authentication method, wherein the second authentication method has a higher security than the first authentication method. The first triggering module may be configured to trigger a procedure of the second authentication method related to an authentication authorization and accounting (AAA) server.

In an embodiment, the session management and gateway entity may further comprise a first sending module configured to send an access request comprising the identity of the terminal device.

In an embodiment, the session management and gateway entity may further comprise a second receiving module configured to receive an access accept message including authorization data from the AAA server.

In an embodiment, the session management and gateway entity may further comprise a second sending module configured to send information indicating that authentication related to the terminal device is pending to a policy control function.

In an embodiment, the session management and gateway entity may further comprise a third receiving module configured to receive default quality of service (QoS) information from the policy control function.

In an embodiment, the session management and gateway entity may further comprise a fourth receiving module configured to receive information indicating that the second authentication method is successful from the AAA server.

In an embodiment, the session management and gateway entity may further comprise a third sending module configured to send information indicating that the second authentication method is successful to the policy control function.

In an embodiment, the session management and gateway entity may further comprise a fifth receiving module configured to receive at least one service policy and charging control rule from the policy control function.

In an embodiment, the session management and gateway entity may further comprise a fourth sending module configured to send a message comprising the information indicating that the second authentication method is successful and quality of service (QoS) information to the mobile management entity.

In an embodiment, the session management and gateway entity may further comprise a second determining module configured to determine that the second authentication method is failed.

In an embodiment, the session management and gateway entity may further comprise a second triggering module configured to trigger a session deletion procedure.

In a twelfth aspect of the disclosure, there is provided a mobile management entity. The mobile management entity comprises a first receiving module and a first sending module. The first receiving module may be configured to receive an attach request from a terminal device. The first sending module may be configured to send a create session request comprising an identity of the terminal device to a session management and gateway entity. A procedure of a second authentication method rather than a procedure of a first authentication method is to be triggered by the session management and gateway entity. The second authentication method has a higher security than the first authentication method.

In an embodiment, the mobile management entity may further comprise a second receiving module configured to receive a message comprising information indicating that the second authentication method is successful and quality of service (QoS) information from the session management and gateway entity.

In an embodiment, the mobile management entity may further comprise a second sending module configured to send a message comprising information indicating that the second authentication method is successful to the terminal device.

In a thirteenth aspect of the disclosure, there is provided a terminal device. The terminal device comprises a sending module. The sending module may be configured to send an attach request to a mobile management entity. A procedure of a second authentication method rather than a procedure of a first authentication method is to be triggered by the session management and gateway entity. The second authentication method has a higher security than the first authentication method.

In an embodiment, the terminal device may further comprise a receiving module configured to receive a message comprising information indicating that the second authentication method is successful from the mobile management entity.

In a fourteenth aspect of the disclosure, there is provided a policy control function. The policy control function comprises a first receiving module and a first sending module. The first receiving module may be configured to receive an attach request from a terminal device. The first sending module may be configured to send default quality of service (QoS) information to the session management and gateway entity. A procedure of a second authentication method rather than a procedure of a first authentication method is to be triggered by the session management and gateway entity. The second authentication method has a higher security than the first authentication method.

In an embodiment, the policy control function may further comprise a second receiving module configured to receive information indicating that the second authentication method is successful from the session management and gateway entity.

In an embodiment, the policy control function may further comprise a second sending module configured to send at least one service policy and charging control rule to the session management and gateway entity.

In a fifteenth aspect of the disclosure, there is provided an AAA server. The AAA server comprises a first receiving module and a first sending module. The first receiving module may be configured to receive an access request comprising an identity of a terminal device from a session management and gateway entity. The first sending module may be configured to send an access accept message including authorization data to the session management and gateway entity. A procedure of a second authentication method rather than a procedure of a first authentication method is to be triggered by the session management and gateway entity. The second authentication method has a higher security than the first authentication method.

In an embodiment, the AAA server may further comprise a determining module configured to determine that the procedure of the second authentication method is not started after a period In an embodiment, the AAA server may further comprise a second sending module configured to send a disconnect request to the session management and gateway entity.

Embodiments herein may provide many advantages, of which a non-exhaustive list of examples follows. In some embodiments herein, the security problem may be solved for the UE which initially attaches to EPS. In some embodiments herein, the security problem may be solved for the UE which initially attaches to EPS and moves to 5GS during session life. In some embodiments herein, the session management and gateway entity such as SMF can get the 5GS attributes from DN-AAA server immediately at UE moving to 5GS. In some embodiments herein, DN-AAA server can have the correct information when triggering re-authentication. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 6*b* shows a flowchart of a method according to another embodiment of the present disclosure;

FIG. 6*c* shows a flowchart of a method according to another embodiment of the present disclosure;

FIG. 6*d* shows a flowchart of a method according to another embodiment of the present disclosure;

FIG. 8*a* is a block diagram showing a session management and gateway entity according to an embodiment of the disclosure;

DETAILED DESCRIPTION

Figures 1, 2:
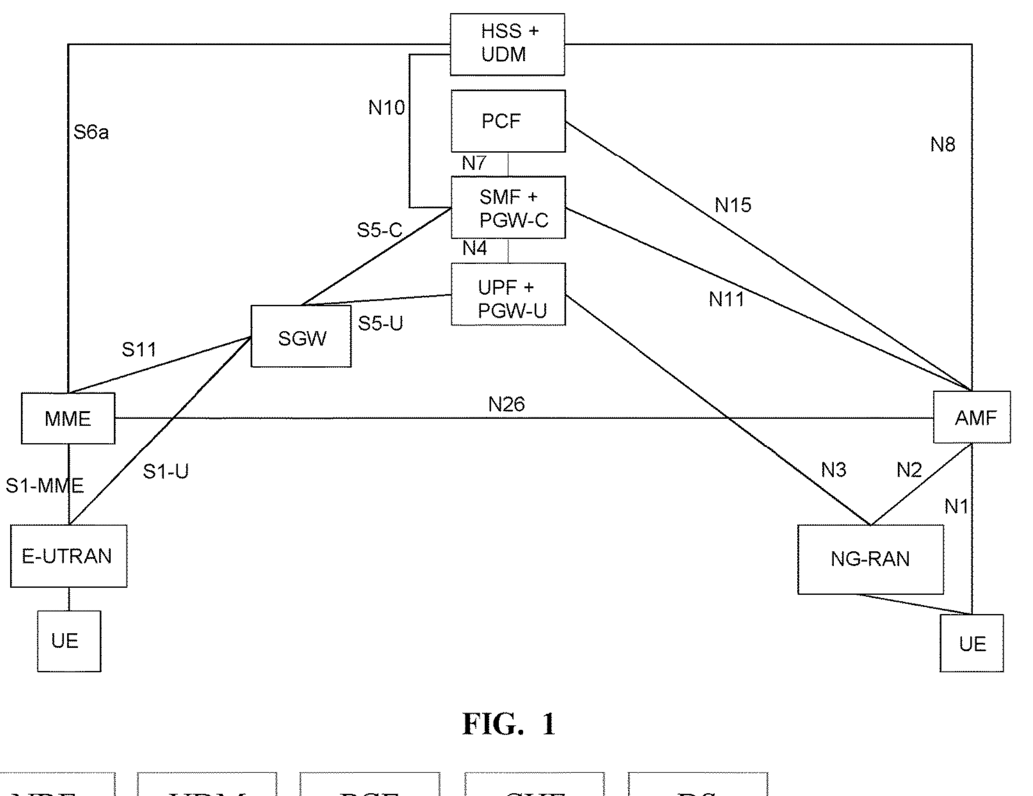
FIG. 1 schematically shows a high level architecture in a 5G network according to an embodiment of the present disclosure.
FIG. 2 schematically shows a system architecture in a 4G network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network entity" or "network node" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW or PG-W), PGW control plane (PGW-C), PGW user plane (PGW-U), Serving gateway (SGW), SGW control plane (SGW-C), SGW user plane (SGW-U), E-UTRAN Node B (eNB), etc. In other embodiments, the network function may comprise different types of NFs for example depending on a specific network.

The network device may be an access network device with accessing function in a communication network via which a terminal device accesses to the network and receives services therefrom. The access network device may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the access network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architectures illustrated in FIGS. 1-2. For simplicity, the system architectures of FIGS. 1-2 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a non-roaming architecture for interworking between 5GS and EPC (Evolved Packet Core)/E-UTRAN (Evolved Universal Terrestrial Radio Access Network) according to an embodiment of the present disclosure. The architecture for of FIG. 1 is same as FIG. 4.3.1-1 as described in 3GPP TS 23.501 V16.7.0.

As shown in FIG. 1, N26 interface is an inter-CN (core network) interface between the MME and 5GS AMF in order to enable interworking between EPC and the NG core. Support of N26 interface in the network is optional for interworking. N26 supports subset of the functionalities (essential for interworking) that are supported over S10. PGW-C+SMF and UPF+PGW-U are dedicated for interworking between 5GS and EPC, which are optional and are based on UE MM (Mobility Management) Core Network Capability and UE subscription. UEs that are not subject to 5GS and EPC interworking may be served by entities not dedicated for interworking, i.e. by either by PGW or SMF/UPF. There can be another UPF (not shown in the FIG. 3) between the NG-RAN (next generation RAN) and the UPF+PGW-U, i.e. the UPF+PGW-U can support N9 towards an additional UPF, if needed. Figures and procedures in this specification that depict an SGW make no assumption whether the SGW is deployed as a monolithic SGW or as an SGW split into its control-plane and user-plane functionality.

FIG. 2 schematically shows a non-roaming architecture for interworking between 5GS and EPC (Evolved Packet Core)/E-UTRAN (Evolved Universal Terrestrial Radio Access Network) according to another embodiment of the present disclosure. CHF denotes Charging Function. CDR denotes Charging Data Record. BS denotes Basic Service. As shown in FIG. 2, DN-AAA may comprise DN-AAA shared server or DN-AAA inband server. The DN-AAA shared server may be connected to the PGW-C+SMF. The DN-AAA inband server may be connected to the PGW-U+UPF.

Figure 3:
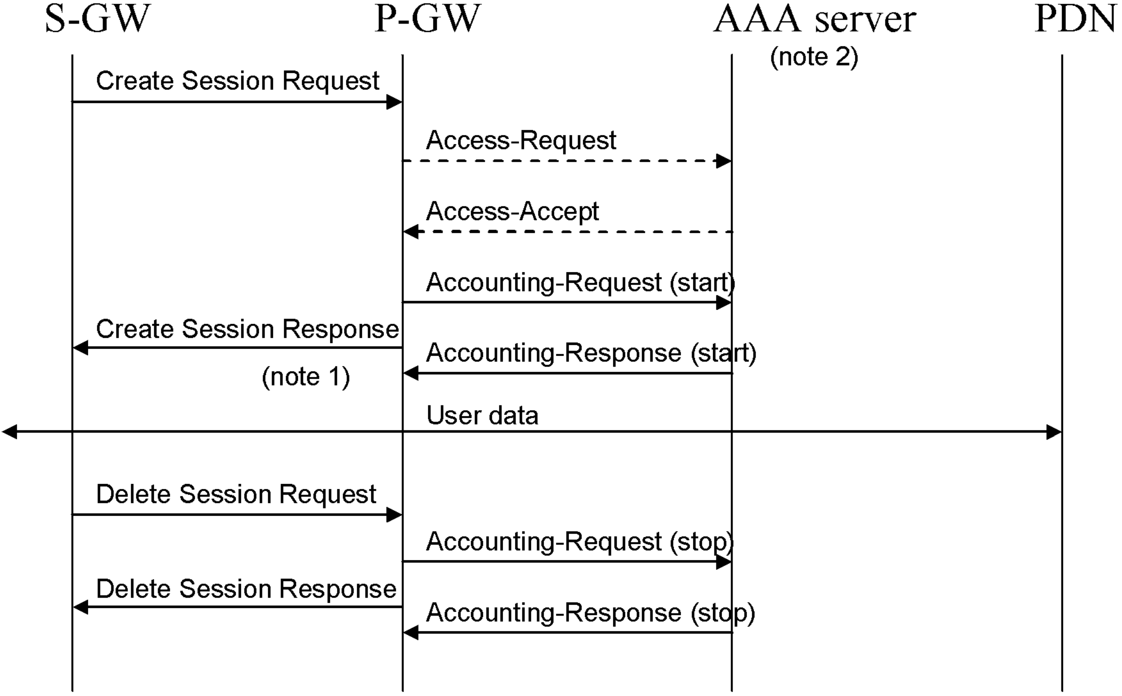
FIG. 3 shows an example of RADIUS message flow on Sgi interface for GTP-based S5/S8 (successful user authentication case)

FIG. 3 shows an example of RADIUS message flow on Sgi interface for GTP-based S5/S8 (successful user authentication case). FIG. 3 is the same as FIG. 25*a*.1 of 3GPP TS 29.061 V17.1.0. As described in clause 16.4.1 of 3GPP TS 29.061 V17.1.0, the Access-Request message (sent from GGSN/P-GW to AAA server) may comprise User-Name and User-Password.

Username is provided to the GGSN/P-GW by the user in Protocol Configuration Options (PCO) or for the case of the P-GW when multiple authentications are supported in the Additional Protocol Configuration Options (APCO) received during IP-CAN (IP (Internet protocol)-Connectivity Access Network) session establishment procedure. If PPP (Point-to-Point Protocol) PDP (Packet Data Protocol) type is used, it is provided to the GGSN (Gateway GPRS (General Packet Radio Service) Support Node) by the user during PPP authentication phase. If no username is available, a generic username, configurable on a per APN (Access Point Name) basis, shall be present. User password is provided to the GGSN/P-GW by the user in the PCO or for the case of the P-GW when multiple authentications are supported in the APCO received during IP-CAN session establishment procedure if PAP is used, If PPP PDP type is used, it is provided to the GGSN by the user during PPP authentication phase. If no password is available a generic password, configurable on a per APN basis, shall be present. The PAP/CHAP does not have proper underlying protection for authentication due to the respective vulnerabilities of PAP and CHAP protocols from a security point of view. For example, the User-Name and the User-Password without any security is transferred in PCO or ePCO.

Figure 4:
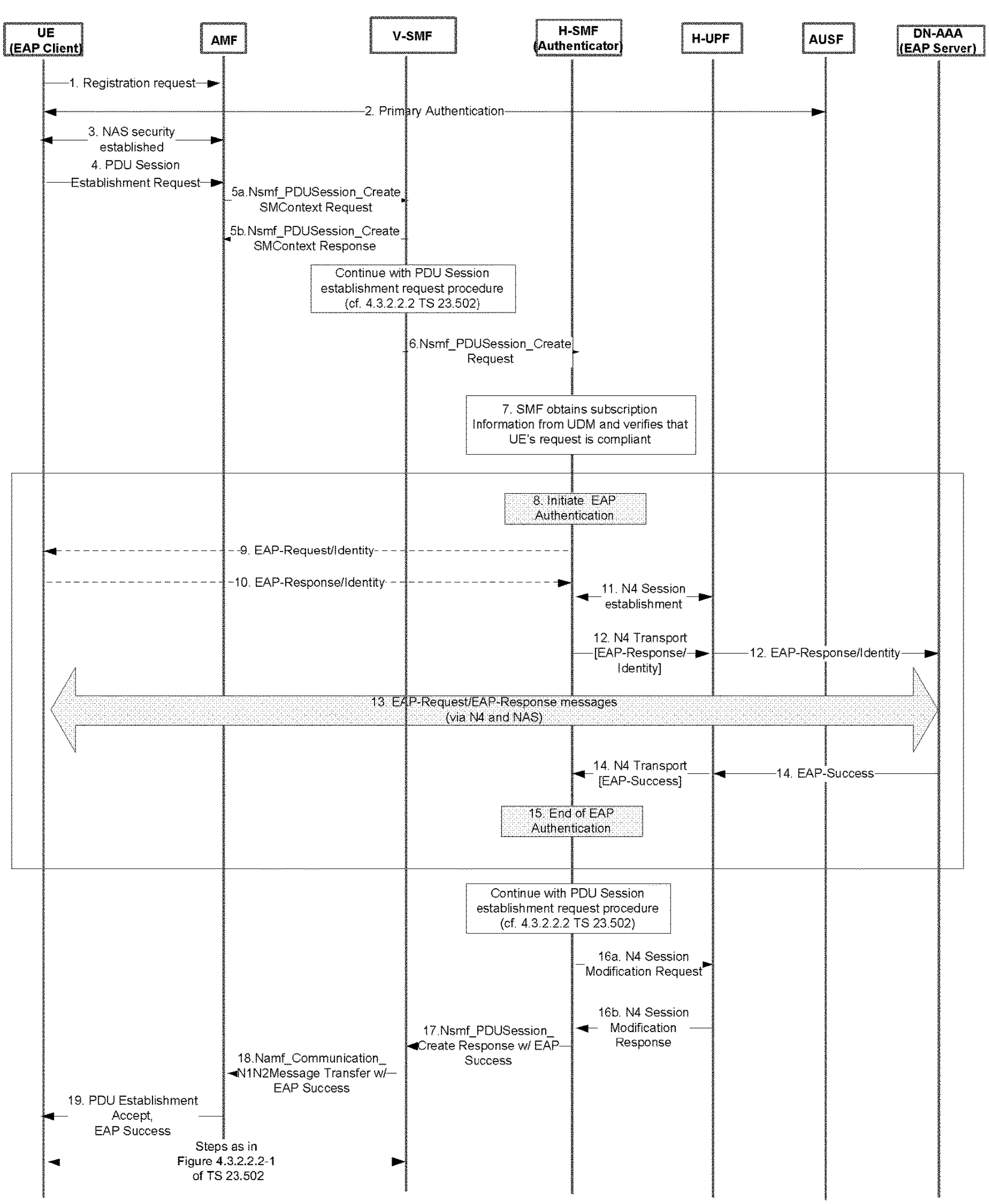
FIG. 4 shows a flowchart of initial EAP Authentication with an external AAA server.

FIG. 4 shows a flowchart of initial EAP Authentication with an external AAA server. FIG. 4 is the same as FIG. 11.1.2-1 of 3GPP TS 33.501 V17.0.0, the disclosure of which is incorporated by reference herein in its entirety.

As described in clause 11.1.2 of 3GPP TS 33.501 V17.0.0, at step 8. The H-SMF (home SMF) shall trigger EAP Authentication to obtain authorization from an external DN-AAA server. If there is no existing N4 session, the H-SMF selects a UPF and establishes an N4 Session with it. The H-SMF notifies the DN-AAA server with the GPSI (Generic Public Subscription Identifier), if available, and the IP address(es) of the UE allocated to the PDU Session if the PDU session is of IP PDU type or the MAC (Medium Access Control) address if the PDU session is of Ethernet PDU type.

At step 9. The H-SMF shall send an EAP Request/Identity message to the UE.

At step 10. The UE shall send an EAP Response/Identity message contained within the SM (session management) PDU DN Request Container of a NAS (Non-Access-Statum) message. The SM PDU DN Request Container includes its DN-specific identity complying with Network Access Identifier (NAI) format and PDU session ID (identifier).

To avoid the additional round-trip in steps 9 and 10, the secondary authentication identity may be sent by the UE in step 4.

At step 11. If there is no existing N4 session, the H-SMF selects a UPF and establishes an N4 Session with it. The SM PDU DN Request Container, if provided by the UE, is forwarded to the UPF. The H-SMF identifies the DN AAA server based on the SM PDU DN Request Container provided by the UE and on local configuration.

At step 12. The UPF shall forward the SM PDU DN Request Container containing EAP Response/Identity message to the DN AAA Server.

At step 13. The DN AAA server and the UE shall exchange EAP messages, as required by the EAP method, contained in the SM PDU DN Request Containers. In addition, it may send additional authorization information as defined in 3GPP TS 33.501 V17.0.0 clause 5.6.6.

At step 14. After the successful completion of the authentication procedure, DN AAA server shall send EAP Success message to the H-SMF.

At step 15. This completes the authentication procedure at the SMF. The SMF may save the DN-specific ID and DNN (or DN's AAA server ID if available) in a list for successful authentication/authorization between UE and an SMF. Alternatively, the SMF may update the list in UDM.

If the authorization is successful, PDU Session Establishment proceeds further starting at step 7a of FIG. 4.3.2.2.1-1 in 3GPP TS 23.502 V16.7.1, the disclosure of which is incorporated by reference herein in its entirety.

Figure 5A:
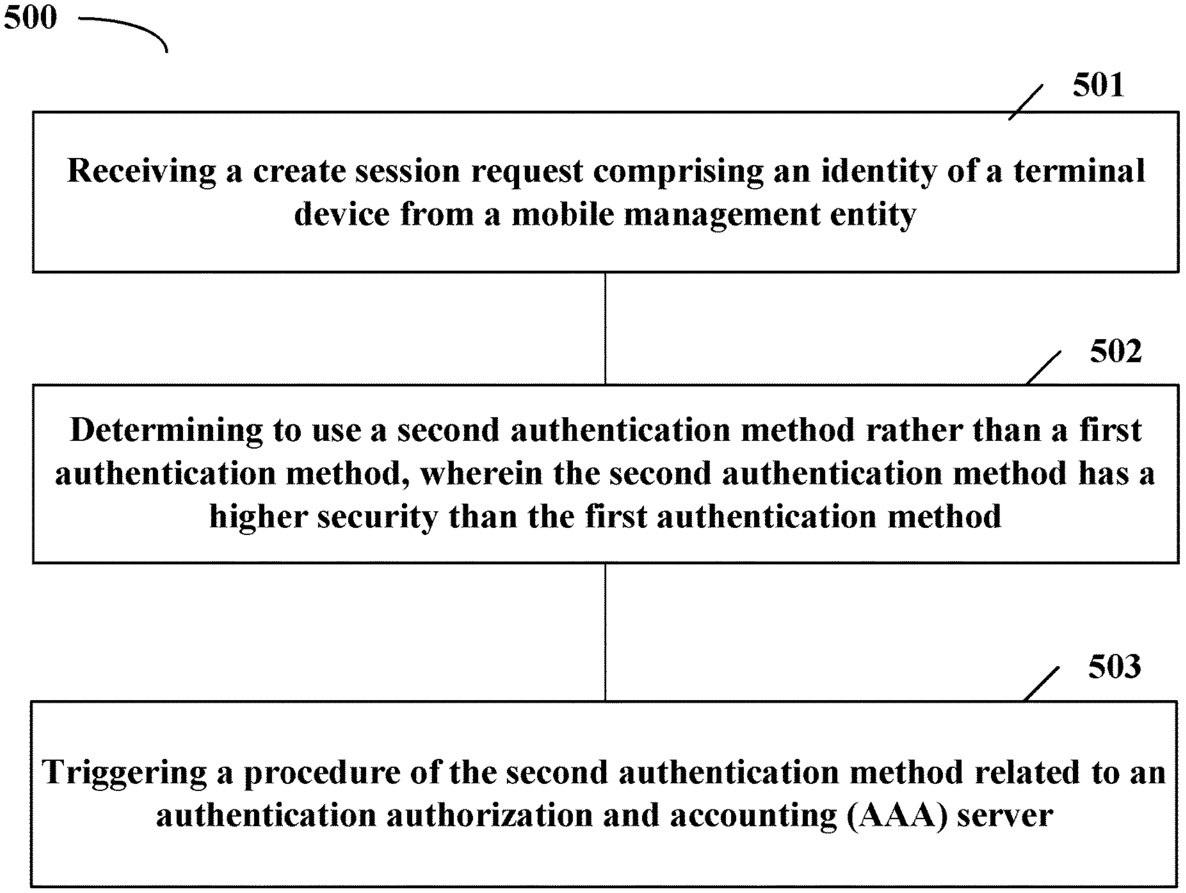
FIG. 5*a* shows a flowchart of a method according to an embodiment of the present disclosure.

FIG. 5*a* shows a flowchart of a method according to an embodiment of the present disclosure, which may be performed by an apparatus implemented in or at or as a session management and gateway entity or communicatively coupled to the session management and gateway entity. As such, the apparatus may provide means or modules for accomplishing various parts of the method 500 as well as means or modules for accomplishing other processes in conjunction with other components. The session management and gateway entity may be any suitable network entity which can implement session management function and gateway function. In an embodiment, the session management and gateway entity may comprise session management function combined with packet data network gateway control plane (SMF+PGW−C).

At block 501, the session management and gateway entity may receive a create session request comprising an identity of a terminal device from a mobile management entity. For example, during an attach procedure, the mobile management entity may send the create session request to the session management and gateway entity. In an embodiment, according to clause 5.3.2 and FIG. 5.3.2.1-1 of 3GPP TS 23.401 V16.9.0, the disclosure of which is incorporated by reference herein in its entirety, the mobile management entity such as MME may send the create session request to serving gateway (SGW). And the serving gateway may send the create session request to the session management and gateway entity such as SMF+PGW−C.

At block 502, the session management and gateway entity may determine to use a second authentication method rather than a first authentication method. The second authentication method has a higher security than the first authentication method.

The second authentication method may be any suitable authentication methods. In an embodiment, the second authentication method comprises extensible authentication protocol (EAP). In other embodiment, the second authentication method may comprises the authentication method used in sixth generation (6G) or beyond 6G communication network as defined by 3GPP.

The first authentication method may be any suitable authentication methods. In an embodiment, the first authentication method comprises password authentication protocol (PAP) or challenge handshake authentication protocol (CHAP).

In an embodiment, the first authentication method is used in a fourth generation (4G) network. In an embodiment, the second authentication method is used in a fifth generation (5G) network.

In an embodiment, the terminal device is accessing a fourth generation (4G) network.

In an embodiment, the create session request excludes a real user name and a user password specific to a data network name. For example, the create session request may exclude the User-Name and User-Password as described in clause 16.4.1 of 3GPP TS 29.061 V17.1.0.

The session management and gateway entity may determine to use a second authentication method rather than a first authentication method in various ways. In an embodiment, the session management and gateway entity may determine to use a second authentication method rather than a first authentication method based on at least one of an agreement with the AAA server; at least one parameter comprised in the create session request; a local configuration of whether the second authentication method should be used; capability of the AAA server; or capability of the terminal device.

For example, the agreement with the AAA server may indicate whether the second authentication method should be used. In an embodiment, the agreement with the AAA server comprises an agreement with the AAA server for a specific data network name (DNN) or single network slice selection assistance information (S-NSSAI).

The local configuration of whether the second authentication method should be used may be configured by the operator. The local configuration of whether the second authentication method should be used may be configured for a single terminal device or a group of terminal device.

At least one parameter comprised in the create session request may comprise PAP/CHAP user credentials. For example, the UE may not provide PAP/CHAP user credentials in the ePCO IE (information element) for example when accessing to EPS. If such information is not provided to the session management and gateway entity, the session management and gateway entity may determine to use the second authentication method rather than the first authentication method.

When the capability of the AAA server indicates that the AAA server supports the second authentication method, the session management and gateway entity may determine to use the second authentication method rather than the first authentication method.

When the capability of the terminal device indicates that the terminal device supports the second authentication method, the session management and gateway entity may determine to use the second authentication method rather than the first authentication method.

At block 503, the session management and gateway entity may trigger a procedure of the second authentication method related to an authentication authorization and accounting (AAA) server. In an embodiment, the AAA server comprises data network AAA (DN-AAA) server.

In an embodiment, the procedure of the second authentication method is trigged after the session is successfully setup. For example, after the session is successfully setup, SMF+PGW−C starts EAP based authentication procedure. SMF+PGW−C triggers Update Bearer Request message including new information: EAP request/identity. The EAP request/identity can be included in ePCO parameter. MME may send the EAP request/identity in NAS message (such as Modify EPS Bearer Context Request) to UE. UE may send the DN-specific identity in EAP message to SMF+PGW−C. SMF+PGW−C may trigger Access Request message with this EAP message to DN-AAA server. The DN AAA server and the UE shall exchange EAP messages, as required by the EAP method, the similar as EAP authentication for 5G PDU Session but with Update Bearer Request/Response procedure.

In an embodiment, when the second authentication method is the extensible authentication protocol (EAP), the procedure of the EAP may be similar to the steps 8-15 of FIG. 4 except that the messages and the network entities may be different in different networks.

In an embodiment, during the procedure of the second authentication method, at least one update bearer request and at least one update bearer response including Extended Protocol Configuration Options (ePCO) with extensible authentication protocol (EAP) message exchange are used between the session management and gateway entity and the mobile management entity. The update bearer request and the update bearer response may be similar to the corresponding message as described in 3GPP TS 23.401 V16.9.0 except that they include Extended Protocol Configuration Options (ePCO) with extensible authentication protocol (EAP) message exchange.

Figures 5B, 5C:
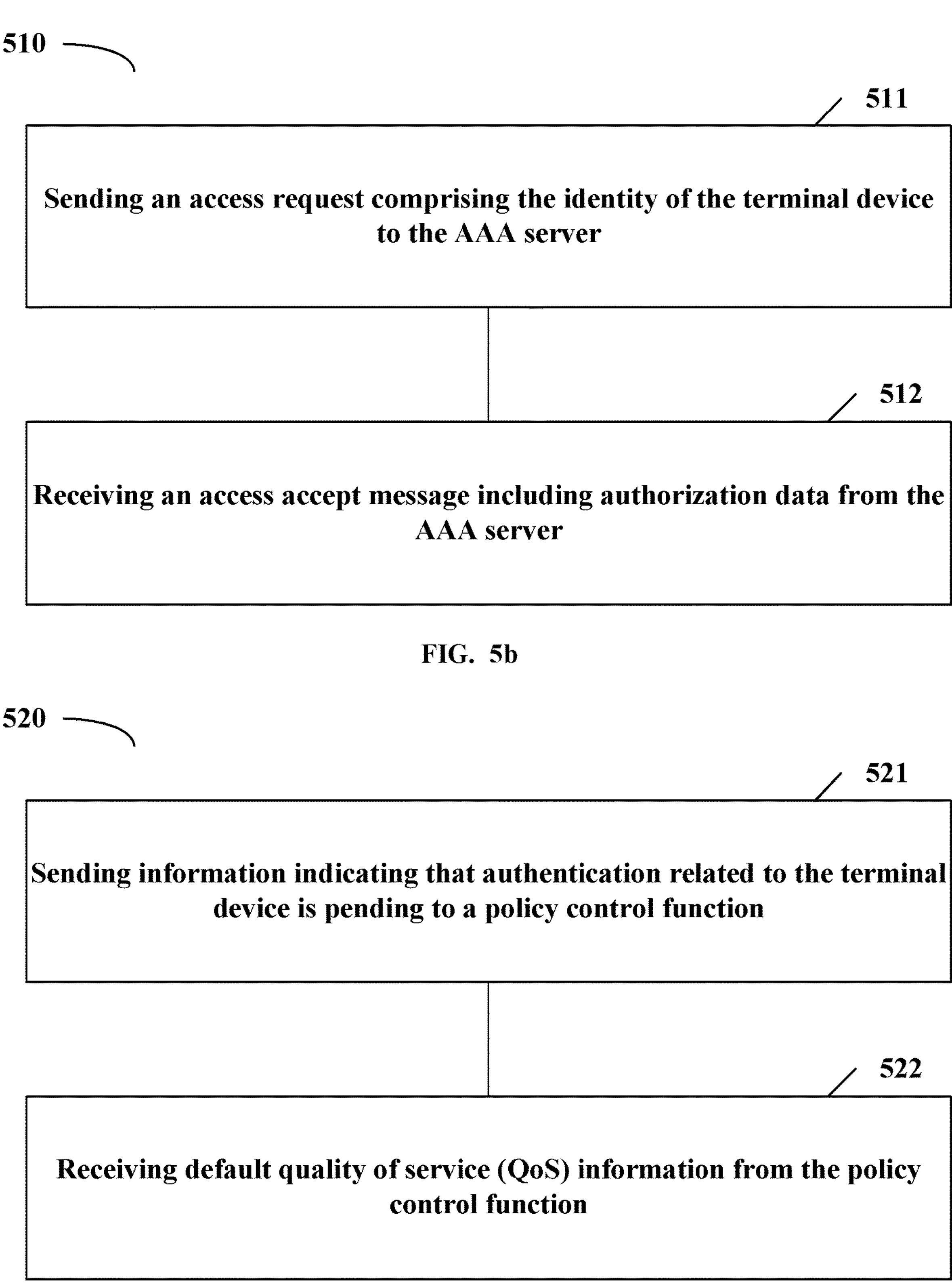
FIG. 5*b* shows a flowchart of a method according to another embodiment of the present disclosure.
FIG. 5*c* shows a flowchart of a method according to another embodiment of the present disclosure.

FIG. 5*b* shows a flowchart of a method 510 according to another embodiment of the present disclosure, which may be performed by an apparatus implemented in or at or as a session management and gateway entity or communicatively coupled to the session management and gateway entity. As such, the apparatus may provide means or modules for accomplishing various parts of the method 510 as well as means or modules for accomplishing other processes in conjunction with other components. For some parts which have been described in the above embodiments, the description thereof is omitted here for brevity.

At block 511, the session management and gateway entity may send an access request comprising the identity of the terminal device to the AAA server. For example, after receiving a create session request comprising an identity of a terminal device from a mobile management entity, the session management and gateway entity may send an access request comprising the identity of the terminal device to the AAA server. The identity of a terminal device may be any suitable identity which can uniquely identify the terminal device. For example, the identity of a terminal device may comprise IMSI (International Mobile Subscriber Identity), MSISDN (Mobile Subscriber ISDN (Integrated Services Digital Network) Number), IMPI (IP Multimedia Private Identity), IMPU (IP Multimedia Public identity), or application-specific identities, etc.

At block 512, the session management and gateway entity may receive an access accept message including authorization data from the AAA server. For example, the authorization data may comprise allocated IP address, idle-timeout or session-timeout, etc.

In an embodiment, the access request may further comprise a void user name or a local configured user name. In another embodiment, the access request may further comprise an indication of only doing authorization. In this case, the AAA server shall do authorization using the identity of a terminal device at first. The AAA server may allocate IP address for the terminal device. The AAA server may start a timer to wait for the second authentication method message (such as EAP message). If no second authentication method message (such as EAP message) is received, the AAA server can send a disconnection request to the session management and gateway entity.

FIG. 5c shows a flowchart of a method 520 according to another embodiment of the present disclosure, which may be performed by an apparatus implemented in or at or as a session management and gateway entity or communicatively coupled to the session management and gateway entity. As such, the apparatus may provide means or modules for accomplishing various parts of the method 520 as well as means or modules for accomplishing other processes in conjunction with other components. For some parts which have been described in the above embodiments, the description thereof is omitted here for brevity.

At block 521, the session management and gateway entity may send information indicating that authentication related to the terminal device is pending to a policy control function. This information can avoid any service triggering (such as any rule from policy control function). For example, after receiving an access accept message including authorization data from the AAA server, the session management and gateway entity may send information indicating that authentication related to the terminal device is pending to a policy control function. This information can be included in any suitable message. In an embodiment, this information can be included in Npcf SMPolicyCreate Request message.

At block 522, the session management and gateway entity may receive default quality of service (QoS) information from the policy control function. The default quality of service (QoS) information can be included in any suitable message. In an embodiment, the default quality of service (QoS) information can be included in Npcf SMPolicyCreate Response message.

Figure 5D:
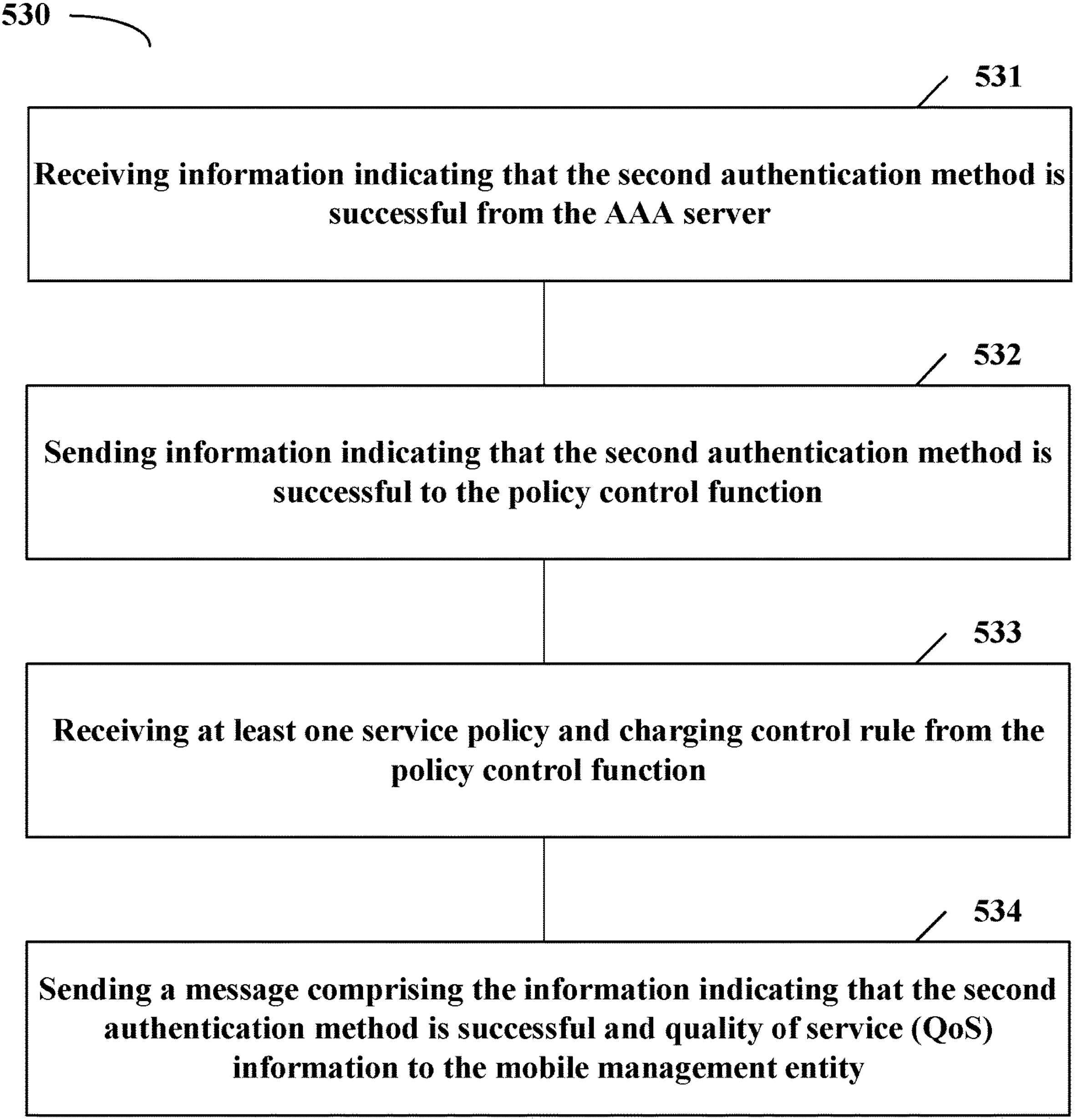
FIG. 5*d* shows a flowchart of a method according to another embodiment of the present disclosure.

FIG. 5d shows a flowchart of a method 530 according to another embodiment of the present disclosure, which may be performed by an apparatus implemented in or at or as a session management and gateway entity or communicatively coupled to the session management and gateway entity. As such, the apparatus may provide means or modules for accomplishing various parts of the method 530 as well as means or modules for accomplishing other processes in conjunction with other components. For some parts which have been described in the above embodiments, the description thereof is omitted here for brevity.

At block 531, the session management and gateway entity may receive information indicating that the second authentication method is successful from the AAA server.

At block 532, the session management and gateway entity may send information indicating that the second authentication method is successful to the policy control function.

At block 533, the session management and gateway entity may receive at least one service policy and charging control rule from the policy control function.

At block 534, the session management and gateway entity may sending a message comprising the information indicating that the second authentication method is successful and quality of service (QoS) information to the mobile management entity.

For example, if the success of the second authentication method such as EAP success is received by the session management and gateway entity such as SMF+PGW−C from the AAA server such as DN-AAA server. SMF+PGW−C should send Npcf SMFPolicyUpdate Request message with information indicating to notify PCF that the authentication is successful and may get service rules from the PCF. SMF+PGW−C sends Update Bearer Request message to MME with the EAP success message and other QoS information.

Figures 5E, 5F:
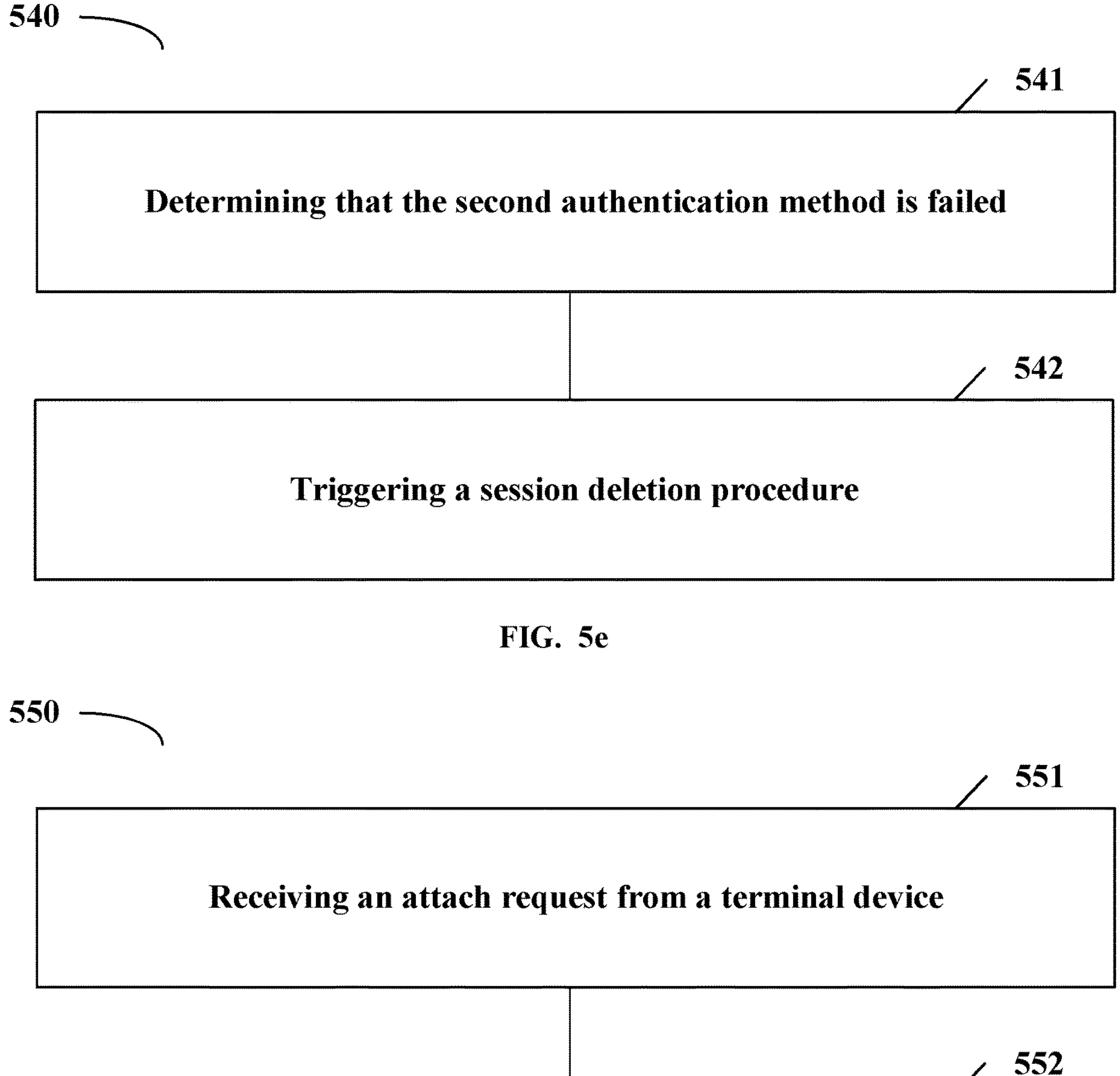
FIG. 5*e* shows a flowchart of a method according to another embodiment of the present disclosure.
FIG. 5*f* shows a flowchart of a method according to another embodiment of the present disclosure.

FIG. 5e shows a flowchart of a method 540 according to another embodiment of the present disclosure, which may be performed by an apparatus implemented in or at or as a session management and gateway entity or communicatively coupled to the session management and gateway entity. As such, the apparatus may provide means or modules for accomplishing various parts of the method 540 as well as means or modules for accomplishing other processes in conjunction with other components. For some parts which have been described in the above embodiments, the description thereof is omitted here for brevity.

At block 541, the session management and gateway entity may determine that the second authentication method is failed. For example, the session management and gateway entity may determine that the second authentication method is failed based on at least of receiving information indicating that the second authentication method is failed from the AAA server; or an update bearer response from the mobile management entity is failed or timeout.

At block 542, the session management and gateway entity may trigger a session deletion procedure.

FIG. 5f shows a flowchart of a method 550 according to another embodiment of the present disclosure, which may be performed by an apparatus implemented in or at or as a mobile management entity or communicatively coupled to the mobile management entity. As such, the apparatus may provide means or modules for accomplishing various parts of the method 550 as well as means or modules for accomplishing other processes in conjunction with other components. For some parts which have been described in the above embodiments, the description thereof is omitted here for brevity.

At block 551, the mobile management entity may receive an attach request from a terminal device. In an embodiment, the attach request excludes a real user name and a user password specific to a data network name.

At block 552, the mobile management entity may send a create session request comprising an identity of the terminal device to a session management and gateway entity. A procedure of a second authentication method rather than a procedure of a first authentication method is to be triggered by the session management and gateway entity. the second authentication method has a higher security than the first authentication method.

Figures 5G, 6A:
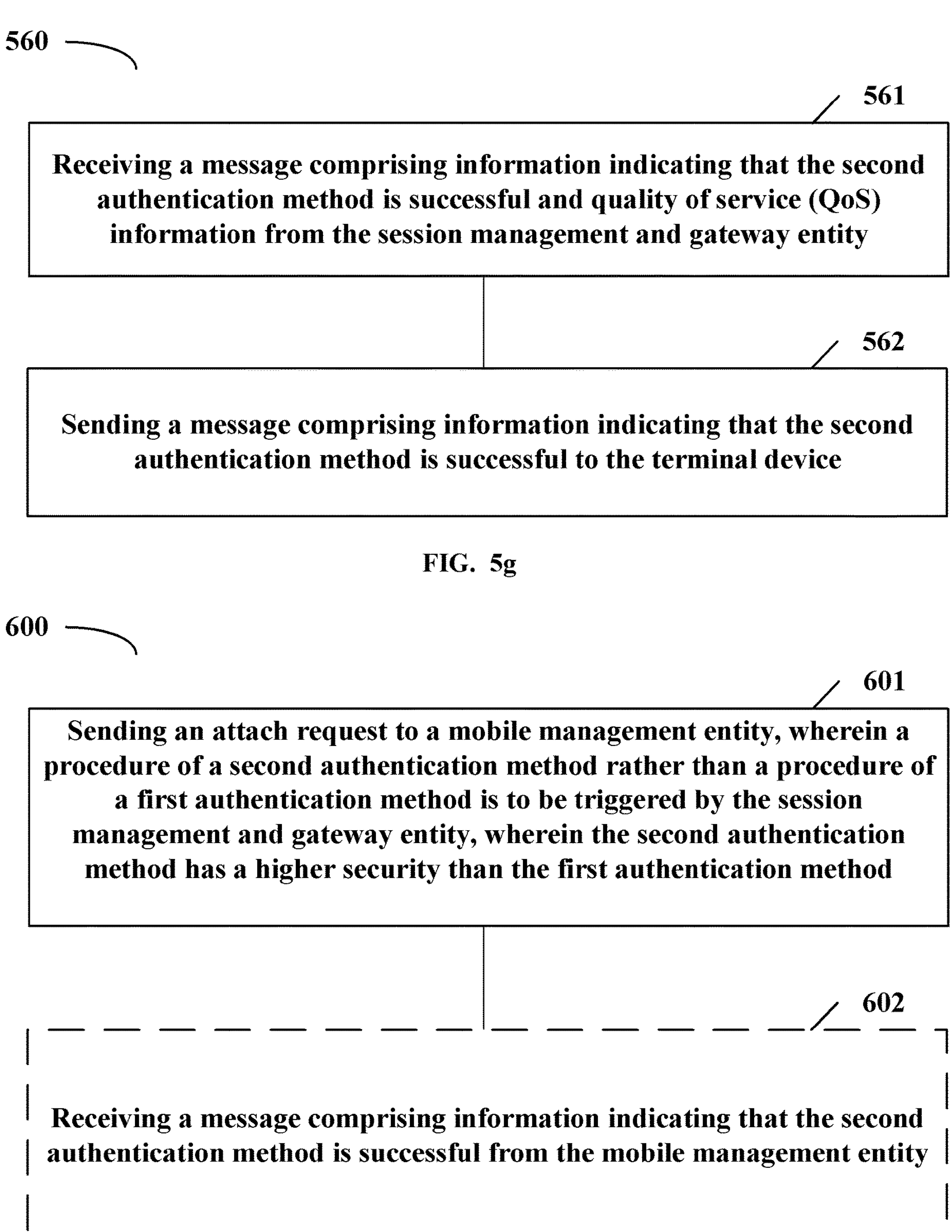
FIG. 5*g* shows a flowchart of a method according to another embodiment of the present disclosure.
FIG. 6*a* shows a flowchart of a method according to another embodiment of the present disclosure.

FIG. 5g shows a flowchart of a method 560 according to another embodiment of the present disclosure, which may be performed by an apparatus implemented in or at or as a mobile management entity or communicatively coupled to the mobile management entity. As such, the apparatus may provide means or modules for accomplishing various parts of the method 560 as well as means or modules for accomplishing other processes in conjunction with other components. For some parts which have been described in the above embodiments, the description thereof is omitted here for brevity.

At block 561, the mobile management entity may receive a message comprising information indicating that the second authentication method is successful and quality of service (QoS) information from the session management and gateway entity.

At block 562, the mobile management entity may send a message comprising information indicating that the second authentication method is successful to the terminal device.

In an embodiment, during the procedure of the second authentication method, at least one modify Evolved Packet System (EPS) bearer context request and at least one modify EPS bearer context accept including Extended Protocol Configuration Options (ePCO) with extensible authentication protocol (EAP) message exchange are used between the terminal device and the mobile management entity.

FIG. 6*a* shows a flowchart of a method 600 according to another embodiment of the present disclosure, which may be performed by an apparatus implemented in or at or as a terminal device or communicatively coupled to the terminal device. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 601, the terminal device may send an attach request to a mobile management entity. A procedure of a second authentication method rather than a procedure of a first authentication method is to be triggered by a session management and gateway entity. The second authentication method has a higher security than the first authentication method At block 602, optionally, the terminal device may receive a message comprising information indicating that the second authentication method is successful from the mobile management entity.

FIG. 6*b* shows a flowchart of a method 610 according to another embodiment of the present disclosure, which may be performed by an apparatus implemented in or at or as a policy control function or communicatively coupled to the policy control function. As such, the apparatus may provide means or modules for accomplishing various parts of the method 610 as well as means or modules for accomplishing other processes in conjunction with other components. For some parts which have been described in the above embodiments, the description thereof is omitted here for brevity. In an embodiment, the policy control function may be PCF as described in 3GPP TS 23.501 V16.7.0.

At block 611, the policy control function may receive information indicating that authentication related to a terminal device is pending from a session management and gateway entity.

At block 612, the policy control function may send default quality of service (QoS) information to the session management and gateway entity. A procedure of a second authentication method rather than a procedure of a first authentication method is to be triggered by the session management and gateway entity. The second authentication method has a higher security than the first authentication method.

FIG. 6*c* shows a flowchart of a method 620 according to another embodiment of the present disclosure, which may be performed by an apparatus implemented in or at or as a policy control function or communicatively coupled to the policy control function. As such, the apparatus may provide means or modules for accomplishing various parts of the method 620 as well as means or modules for accomplishing other processes in conjunction with other components. For some parts which have been described in the above embodiments, the description thereof is omitted here for brevity. In an embodiment, the policy control function may be PCF as described in 3GPP TS 23.501 V16.7.0.

At block 621, the policy control function may receive information indicating that the second authentication method is successful from the session management and gateway entity.

At block 622, the policy control function may send at least one service policy and charging control rule to the session management and gateway entity.

FIG. 6*d* shows a flowchart of a method 630 according to another embodiment of the present disclosure, which may be performed by an apparatus implemented in or at or as an AAA server or communicatively coupled to the AAA server. As such, the apparatus may provide means or modules for accomplishing various parts of the method 630 as well as means or modules for accomplishing other processes in conjunction with other components. For some parts which have been described in the above embodiments, the description thereof is omitted here for brevity. In an embodiment, the AAA server may be DN-AAA as described in 3GPP TS 23.502 V16.7.1.

At block 631, the AAA server may receive an access request comprising an identity of a terminal device from a session management and gateway entity.

At block 632, the AAA server may send an access accept message including authorization data to the session management and gateway entity. A procedure of a second authentication method rather than a procedure of a first authentication method is to be triggered by the session management and gateway entity. The second authentication method has a higher security than the first authentication method.

At block 633, optionally, after successful completion of the procedure of the second authentication method, the AAA server may send information indicating that the second authentication method is successful to the session management and gateway entity.

Figure 6E:
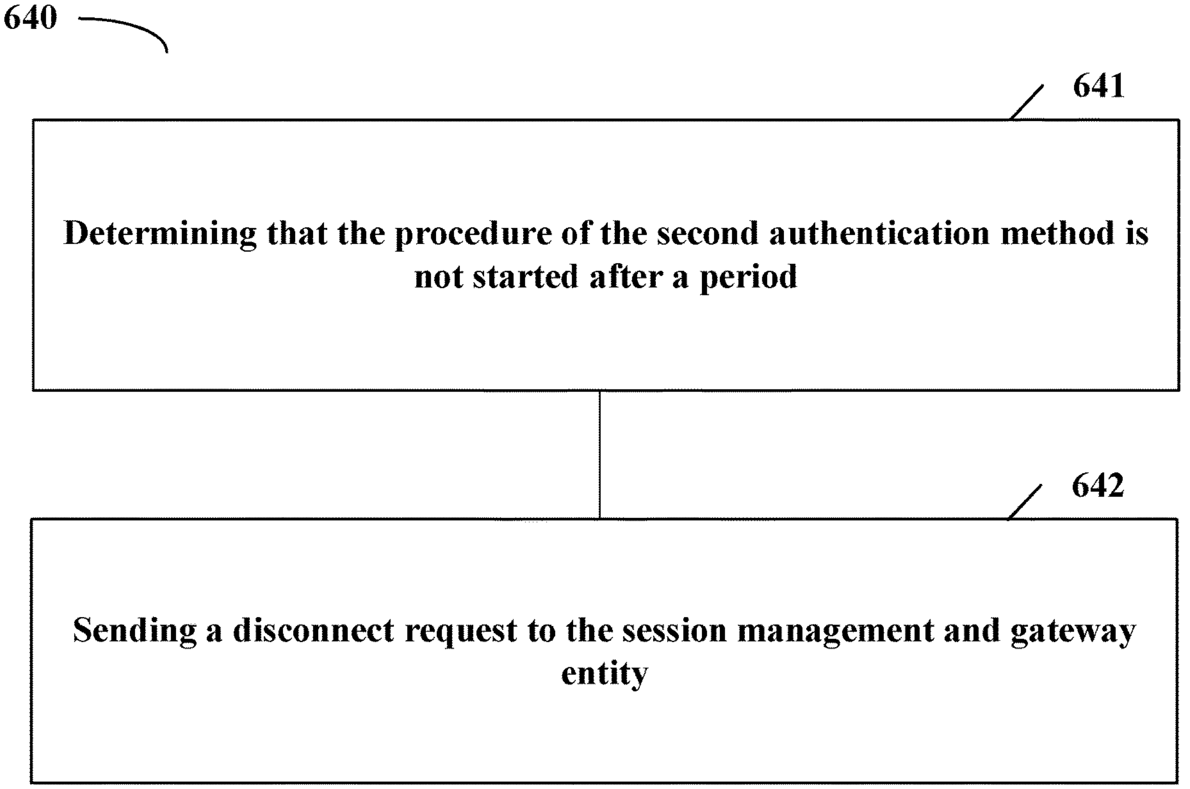
FIG. 6*e* shows a flowchart of a method according to another embodiment of the present disclosure.

FIG. 6*e* shows a flowchart of a method 640 according to another embodiment of the present disclosure, which may be performed by an apparatus implemented in or at or as an AAA server or communicatively coupled to the AAA server. As such, the apparatus may provide means or modules for accomplishing various parts of the method 640 as well as means or modules for accomplishing other processes in conjunction with other components. For some parts which have been described in the above embodiments, the description thereof is omitted here for brevity.

At block 641, the AAA server may determine that the procedure of the second authentication method is not started after a period. The period may be any suitable period which may be configured by the network operator.

At block 642, the AAA server may send a disconnect request to the session management and gateway entity.

Figure 6F:
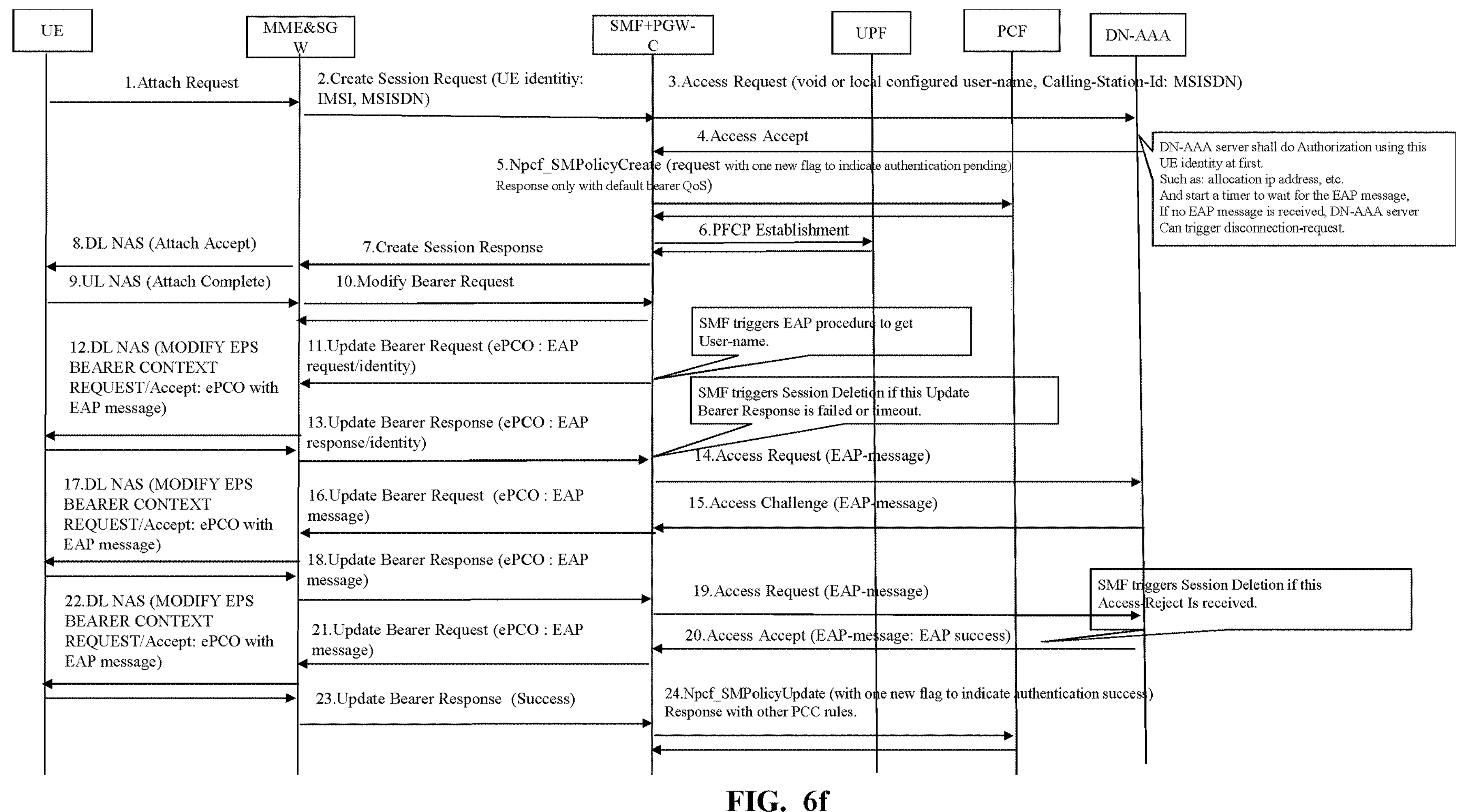
FIG. 6*f* shows a flowchart of a method according to another embodiment of the present disclosure.

FIG. 6*f* shows a flowchart of a method according to another embodiment of the present disclosure.

At step 1. The UE sends an Attach Request to MME & SGW.

At step 2. MME sends Create Session Request with UE identity (such as IMSI or MSISDN) to SMF+PGW−C.

At step 3. SMF can decide if EAP based authentication is needed or not for example base on the agreement with DN-AAA server for the specific DNN/S-NSSAI or a local configuration of whether EAP based AUTH should be triggered. So SMF+PGW−C can send Access Request message with UE identity (such as MSISDN) to DN-AAA server to get authorization data (such as allocated IP address, idle-timeout or session-timeout, etc.) from DN-AAA server in Access-Accept message. The Access Request message may comprise a void user-name or a local configured user-name.

At step 4. DN-AAA server shall do Authorization using the UE identity at first. DN-AAA server may allocate IP address for the UE. DN-AAA server may start a timer to wait for the EAP message. If no EAP message is received when the time is up, DN-AAA server can trigger disconnection-request.

At step 5. If PCF is enabled, SMF+PGW−C sends indication in Npcf SMPolicyCreate Request message to indicate that the authentication is pending to avoid any service triggering (such as any rule from PCF).

At step 6. Packet Forwarding Control Plane (PFCP) association is established between SMF+PGW−C and UPF.

At steps 7-10. SMF+PGW−C continues the session creation procedure and the session is successfully setup as current standard. At step 7. SMF+PGW−C sends Create Session Response to MME&SGW. At step 8. M_ME&SGW sends DL (downlink) NAS (Attach Accept) to UE. At step 9. UE sends UL (uplink) NAS (Attach Complete) to MME&SGW. At step 10. M_ME&SGW sends Modify Bearer Request to SMF+PGW−C.

At step 11. after the session is successfully setup, SMF+PGW−C starts EAP based authentication procedure. SMF+PGW−C triggers Update Bearer Request message including new information: EAP request/identity, which can be included in ePCO parameter.

At step 12. MME sends the EAP message in DL NAS message to UE, such as Modify EPS Bearer Context Request. UE sends the DN-specific identity in the EAP message in Modify EPS Bearer Context Accept to MME.

At step 13. MME sends Update Bearer Response (ePCO: EAP response/identity) to SMF+PGW−C. SMF triggers Session Deletion if the Update Bearer Response is failed or timeout.

At step 14. SMF+PGW−C sends Access Request (EAP-message) to DN-AAA server.

At steps 15-22. The DN AAA server and the UE shall exchange EAP messages, as required by the EAP method, the steps 15-22 are similar as the corresponding steps of EAP authentication for 5G PDU Session but with Update Bearer Request/Response procedure.

At steps 15, DN-AAA server sends Access Challenge (EAP-message) to SMF+PGW−C.

At steps 16, SMF+PGW−C sends an update bearer request including Extended Protocol Configuration Options (ePCO) with extensible authentication protocol (EAP) message to MME.

At steps 17, MME sends a DL NAS message such as modify Evolved Packet System (EPS) bearer context request including Extended Protocol Configuration Options (ePCO) with extensible authentication protocol (EAP) message to UE. UE sends a UL NAS message such as a modify EPS bearer context accept including Extended Protocol Configuration Options (ePCO) with extensible authentication protocol (EAP) message to MME.

At steps 18, MME sends an update bearer response including Extended Protocol Configuration Options (ePCO) with extensible authentication protocol (EAP) message to SMF+PGW−C.

At steps 19, SMF+PGW−C sends access request (EAP message) to DN-AAA server.

At step 20. SMF+PGW−C receives the EAP success from DN-AAA server. SMF may trigger Session Deletion if the Access-Reject is received from DN-AAA server.

At step 21. If the EAP success is received by SMF+PGW−C from DN-AAA server, SMF+PGW−C sends Update Bearer Request (the EAP success message and other QoS information) to MME.

At step 22. MME sends DL NAS message such as modify EPS bearer context request (ePCO with EAP message) to UE. UE sends UL NAS message such as modify EPS bearer context Accept (ePCO with EAP message) to MME.

At step 23. MME sends Update Bearer Response (Success) to SMF+PGW−C.

At step 24. If the EAP success is received by SMF+PGW−C from DN-AAA server, SMF+PGW−C sends Npcf SMFPolicyUpdate Request message with information indicating to notify PCF that the authentication is successful and may get service rules from PCF.

Figure 7:
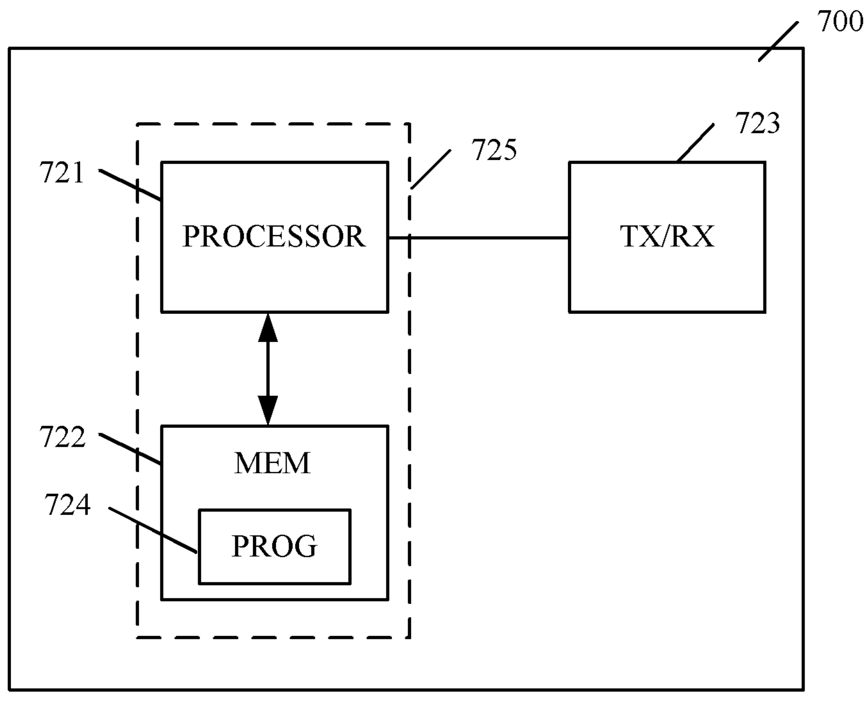
FIG. 7 is a block diagram showing an apparatus suitable for practicing some embodiments of the disclosure.

FIG. 7 is a block diagram showing an apparatus suitable for practicing some embodiments of the disclosure. For example, any one of the session management and gateway entity, the mobile management entity, the terminal device, policy control function and the AAA server described above may be implemented as or through the apparatus 700.

The apparatus 700 comprises at least one processor 721, such as a digital processor (DP), and at least one memory (MEM) 722 coupled to the processor 721. The apparatus 720 may further comprise a transmitter TX and receiver RX 723 coupled to the processor 721. The MEM 722 stores a program (PROG) 724. The PROG 724 may include instructions that, when executed on the associated processor 721, enable the apparatus 720 to operate in accordance with the embodiments of the present disclosure. A combination of the at least one processor 721 and the at least one MEM 722 may form processing means 725 adapted to implement various embodiments of the present disclosure.

Various embodiments of the present disclosure may be implemented by computer program executable by one or more of the processor 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the session management and gateway entity, the memory 722 contains instructions executable by the processor 721, whereby the session management and gateway entity operates according to any of the methods related to the session management and gateway entity as described above.

In an embodiment where the apparatus is implemented as or at the mobile management entity, the memory 722 contains instructions executable by the processor 721, whereby the mobile management entity operates according to any of the methods related to the mobile management entity as described above.

In an embodiment where the apparatus is implemented as or at the terminal device, the memory 722 contains instructions executable by the processor 721, whereby the terminal device operates according to any of the methods related to the terminal device as described above.

In an embodiment where the apparatus is implemented as or at policy control function, the memory 722 contains instructions executable by the processor 721, whereby policy control function operates according to any of the methods related to the policy control function as described above.

In an embodiment where the apparatus is implemented as or at the AAA server, the memory 722 contains instructions executable by the processor 721, whereby the AAA server operates according to any of the methods related to the AAA server as described above.

FIG. 8*a* is a block diagram showing a session management and gateway entity according to an embodiment of the disclosure. As shown, the session management and gateway entity 800 comprises a first receiving module 801, a first determining module 802 and a first triggering module 803. The first receiving module 801 may be configured to receive a create session request comprising an identity of a terminal device from a mobile management entity. The first determining module 802 may be configured to determining to use a second authentication method rather than a first authentication method, wherein the second authentication method has a higher security than the first authentication method. The first triggering module 803 may be configured to trigger a procedure of the second authentication method related to an authentication authorization and accounting (AAA) server.

In an embodiment, the session management and gateway entity 800 may further comprise a first sending module 804 configured to send an access request comprising the identity of the terminal device.

In an embodiment, the session management and gateway entity 800 may further comprise a second receiving module 805 configured to receive an access accept message including authorization data from the AAA server.

In an embodiment, the session management and gateway entity 800 may further comprise a second sending module 806 configured to send information indicating that authentication related to the terminal device is pending to a policy control function.

In an embodiment, the session management and gateway entity 800 may further comprise a third receiving module 807 configured to receive default quality of service (QoS) information from the policy control function.

In an embodiment, the session management and gateway entity 800 may further comprise a fourth receiving module 808 configured to receive information indicating that the second authentication method is successful from the AAA server.

In an embodiment, the session management and gateway entity 800 may further comprise a third sending module 809 configured to send information indicating that the second authentication method is successful to the policy control function.

In an embodiment, the session management and gateway entity 800 may further comprise a fifth receiving module 810 configured to receive at least one service policy and charging control rule from the policy control function.

In an embodiment, the session management and gateway entity 800 may further comprise a fourth sending module 811 configured to send a message comprising the information indicating that the second authentication method is successful and quality of service (QoS) information to the mobile management entity.

In an embodiment, the session management and gateway entity 800 may further comprise a second determining module 812 configured to determine that the second authentication method is failed.

In an embodiment, the session management and gateway entity 800 may further comprise a second triggering module 813 configured to trigger a session deletion procedure.

Figure 8B:
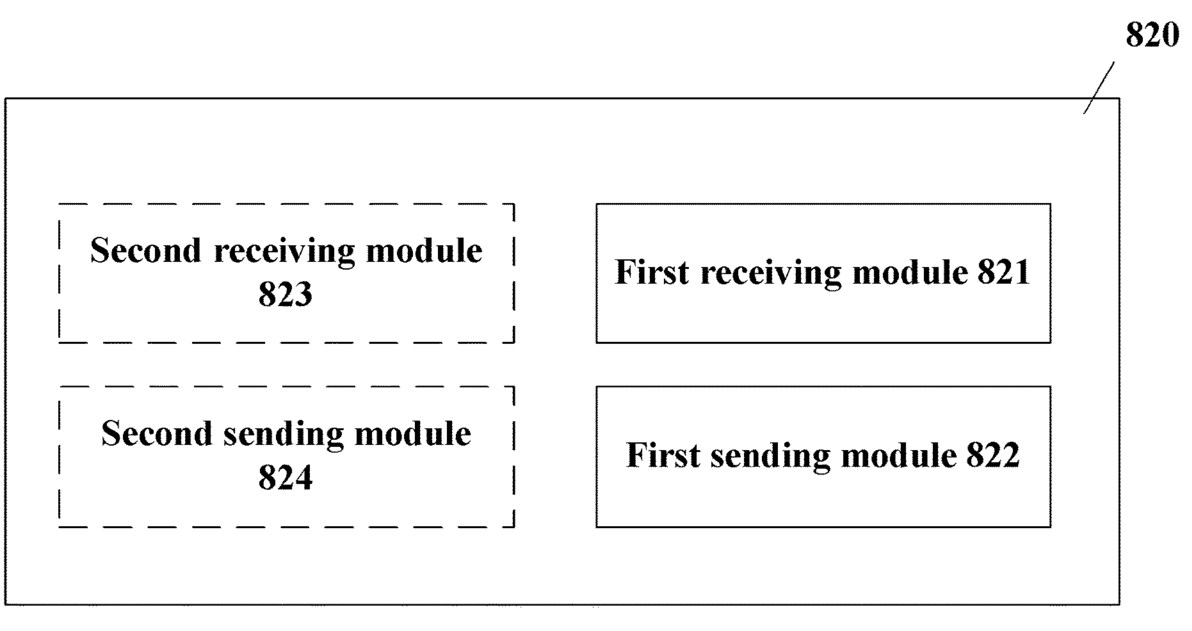
FIG. 8*b* is a block diagram showing a mobile management entity according to an embodiment of the disclosure.

FIG. 8*b* is a block diagram showing a mobile management entity according to an embodiment of the disclosure. As shown, the mobile management entity 820 comprises a first receiving module 821 and a first sending module 822. The first receiving module 821 may be configured to receive an attach request from a terminal device. The first sending module 822 may be configured to send a create session request comprising an identity of the terminal device to a session management and gateway entity. A procedure of a second authentication method rather than a procedure of a first authentication method is to be triggered by the session management and gateway entity. The second authentication method has a higher security than the first authentication method.

In an embodiment, the mobile management entity 820 may further comprise a second receiving module 823 configured to receive a message comprising information indicating that the second authentication method is successful and quality of service (QoS) information from the session management and gateway entity.

In an embodiment, the mobile management entity 820 may further comprise a second sending module 824 configured to send a message comprising information indicating that the second authentication method is successful to the terminal device.

Figure 8C:
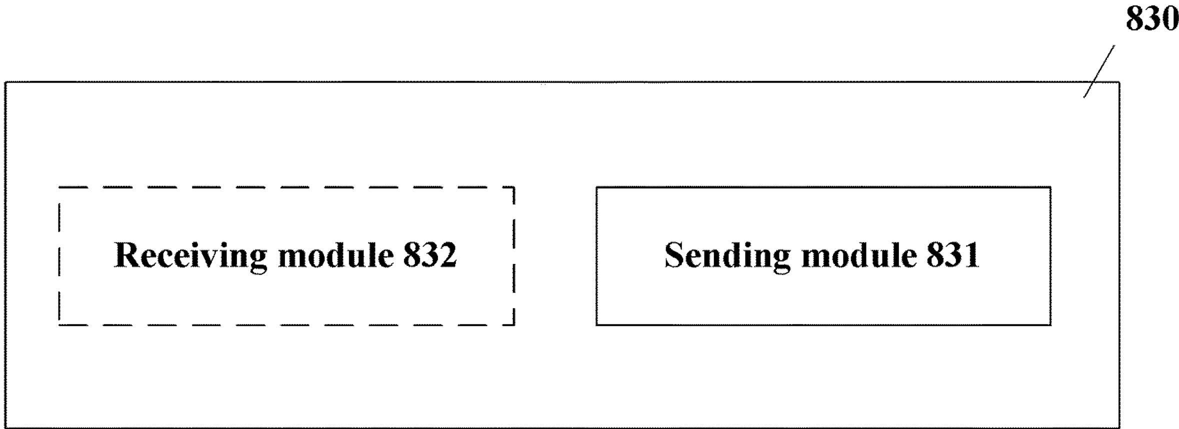
FIG. 8*c* is a block diagram showing a terminal device according to an embodiment of the disclosure.

FIG. 8*c* is a block diagram showing a terminal device according to an embodiment of the disclosure. As shown, the terminal device 830 comprises a sending module 831. The sending module 831 may be configured to send an attach request to a mobile management entity. A procedure of a second authentication method rather than a procedure of a first authentication method is to be triggered by the session management and gateway entity. The second authentication method has a higher security than the first authentication method.

In an embodiment, the terminal device 830 may further comprise a receiving module 832 configured to receive a message comprising information indicating that the second authentication method is successful from the mobile management entity.

Figure 8D:
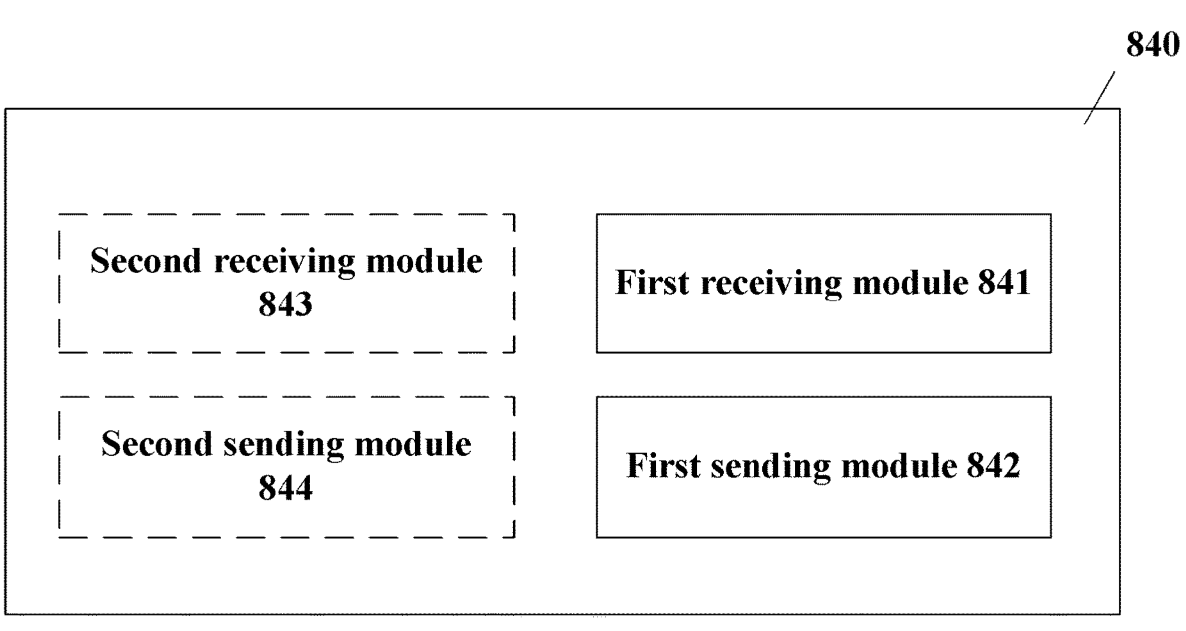
FIG. 8*d* is a block diagram showing a policy control function according to an embodiment of the disclosure.

FIG. 8*d* is a block diagram showing a policy control function according to an embodiment of the disclosure. As shown, the policy control function 840 comprises a first receiving module 841 and a first sending module 842. The first receiving module 841 may be configured to receive an attach request from a terminal device. The first sending module 842 may be configured to send default quality of service (QoS) information to the session management and gateway entity. A procedure of a second authentication method rather than a procedure of a first authentication method is to be triggered by the session management and gateway entity. The second authentication method has a higher security than the first authentication method.

In an embodiment, the policy control function 840 may further comprise a second receiving module 843 configured to receive information indicating that the second authentication method is successful from the session management and gateway entity.

In an embodiment, the policy control function 840 may further comprise a second sending module 844 configured to send at least one service policy and charging control rule to the session management and gateway entity.

Figure 8E:
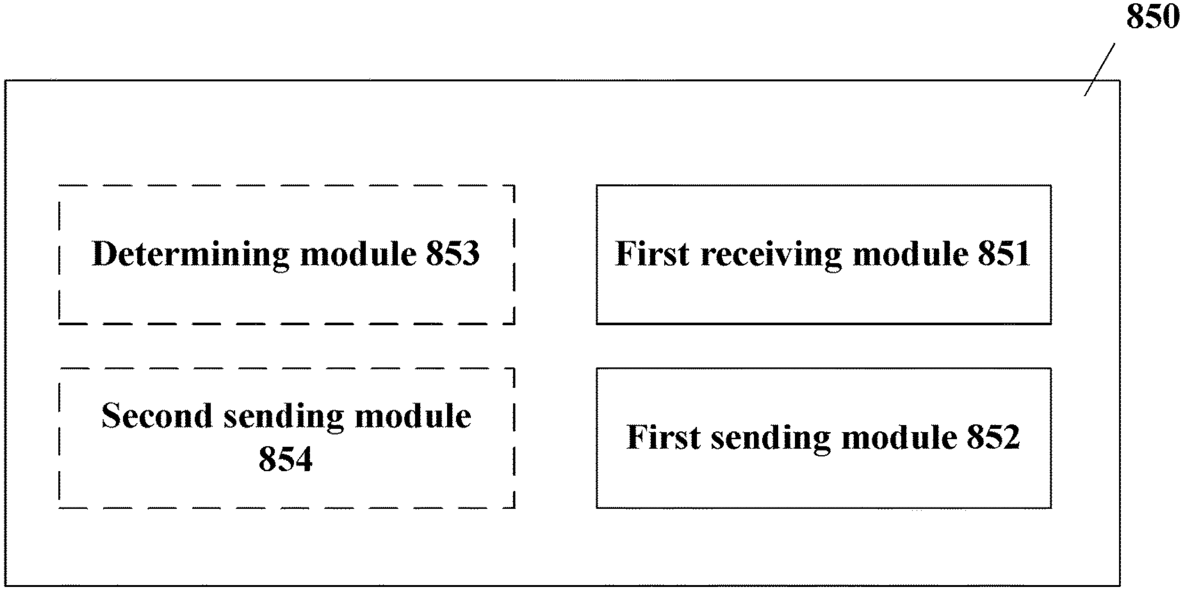
FIG. 8*e* is a block diagram showing an AAA server according to an embodiment of the disclosure.

FIG. 8*e* is a block diagram showing an AAA server according to an embodiment of the disclosure. As shown, the AAA server 850 comprises a first receiving module 851 and a first sending module 852. The first receiving module 851 may be configured to receive an access request comprising an identity of a terminal device from a session management and gateway entity. The first sending module 852 may be configured to send an access accept message including authorization data to the session management and gateway entity. A procedure of a second authentication method rather than a procedure of a first authentication method is to be triggered by the session management and gateway entity. The second authentication method has a higher security than the first authentication method.

In an embodiment, the AAA server 850 may further comprise a determining module 853 configured to determine that the procedure of the second authentication method is not started after a period In an embodiment, the AAA server 850 may further comprise a second sending module 854 configured to send a disconnect request to the session management and gateway entity.

Embodiments herein may provide many advantages, of which a non-exhaustive list of examples follows. In some embodiments herein, the security problem may be solved for the UE which initially attaches to EPS. In some embodiments herein, the security problem may be solved for the UE which initially attaches to EPS and moves to 5GS during session life. In some embodiments herein, the session management and gateway entity such as SMF can get the 5GS attributes from DN-AAA server immediately at UE moving to 5GS. In some embodiments herein, DN-AAA server can have the correct information when triggering re-authentication. The embodiments herein are not limited to the features and advantages mentioned above. A person skilled in the art will recognize additional features and advantages upon reading the following detailed description.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the session management and gateway entity, the mobile management entity, the terminal device, policy control function and the AAA server may not need a fixed processor or memory, any computing resource and storage resource may be arranged from the session management and gateway entity, the mobile management entity, the terminal device, policy control function and the AAA server in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a session management and gateway entity, comprising:

receiving a create session request comprising an identity of a terminal device from a mobile management entity, wherein the create session request excludes a real user name and a user password specific to a data network name;

determining to use a second authentication method rather than a first authentication method based on the exclusion of the real user name and the user password specific to the data network name, wherein the second authentication method has a higher security than the first authentication method; and triggering a procedure of the second authentication method related to an authentication authorization and accounting (AAA) server, wherein during the procedure of the second authentication method, at least one update bearer request and at least one update bearer response including Extended Protocol Configuration Options (ePCO) with extensible authentication protocol (EAP) message exchange are used between the session management and gateway entity and the mobile management entity.

2. The method according to claim 1, further comprising:

sending an access request comprising the identity of the terminal device to the AAA server; and receiving an access accept message including authorization data from the AAA server.

3. The method according to claim 2, wherein the access request further comprises a void user name or a local configured user name.

4. The method according to claim 1, further comprising:

sending information indicating that authentication related to the terminal device is pending to a policy control function; and receiving default quality of service (QoS) information from the policy control function.

5. The method according to claim 1, wherein the procedure of the second authentication method is trigged after the session is successfully setup.

6. The method according to claim 1, further comprising:

receiving information indicating that the second authentication method is successful from the AAA server;

sending information indicating that the second authentication method is successful to the policy control function; and receiving at least one service policy and charging control rule from the policy control function.

7. The method according to claim 6, further comprising:

sending a message comprising the information indicating that the second authentication method is successful and quality of service (QoS) information to the mobile management entity.

8. The method according to claim 1, further comprising:

determining that the second authentication method is failed; and triggering a session deletion procedure.

9. The method according to claim 8, wherein determining that the second authentication method is failed is based on at least of:

receiving information indicating that the second authentication method is failed from the AAA server; or an update bearer response from the mobile management entity is failed or timeout.

10. The method according to claim 1, wherein the second authentication method comprises extensible authentication protocol (EAP).

11. The method according to claim 1, wherein the first authentication method comprises password authentication protocol (PAP) or challenge handshake authentication protocol (CHAP).

12. The method according to claim 1, wherein determining to use the second authentication method rather than the first authentication method is based on at least one of:

an agreement with the AAA server;

at least one parameter comprised in the create session request;

a local configuration of whether the second authentication method should be used;

capability of the AAA server; or capability of the terminal device.

13. The method according to claim 12, wherein the agreement with the AAA server comprises an agreement with the AAA server for a specific data network name (DNN) or single network slice selection assistance information (S-NSSAI).

14. The method according to claim 1, wherein the session management and gateway entity comprises session management function combined with packet data network gateway control plane (SMF+PGW-C).

15. The method according to claim 1, wherein the AAA server comprises data network AAA (DN-AAA) server.

16. The method according to claim 1, wherein the terminal device is accessing a fourth generation (4G) network.

17. A session management and gateway entity, comprising:

a processor; and a memory coupled to the processor, said memory containing instructions executable by said processor, whereby said session management and gateway entity is operative to:

receive a create session request comprising an identity of a terminal device from a mobile management entity, wherein the create session request excludes a real user name and a user password specific to a data network name;

determine to use a second authentication method rather than a first authentication method based on the exclusion of the real user name and the user password specific to the data network name, wherein the second authentication method has a higher security than the first authentication method; and trigger a procedure of the second authentication method related to an authentication authorization and accounting (AAA) server, wherein during the procedure of the second authentication method, at least one update bearer request and at least one update bearer response including Extended Protocol Configuration Options (ePCO) with extensible authentication protocol (EAP) message exchange are used between a session management and gateway entity and the mobile management entity.

18. The session management and gateway entity according to claim 17, wherein the session management and gateway entity is operative to determine to use the second authentication method rather than the first authentication method based on at least one of: an agreement with the AAA server, at least one parameter comprised in the create session request, a local configuration of whether the second authentication method should be used, capability of the AAA server, or capability of the terminal device.

19. The session management and gateway entity according to claim 18, wherein the agreement with the AAA server comprises an agreement with the AAA server for a specific data network name (DNN) or single network slice selection assistance information (S-NSSAI).

20. A non-transitory computer-readable storage medium storing instructions which, when executed by at least one processor, cause the at least one processor to perform a method comprising:

receiving a create session request comprising an identity of a terminal device from a mobile management entity, wherein the create session request excludes a real user name and a user password specific to a data network name;

determining to use a second authentication method rather than a first authentication method based on the exclusion of the real user name and the user password specific to the data network name, wherein the second authentication method has a higher security than the first authentication method; and triggering a procedure of the second authentication method related to an authentication authorization and accounting (AAA) server, wherein during the procedure of the second authentication method, at least one update bearer request and at least one update bearer response including Extended Protocol Configuration Options (ePCO) with extensible authentication protocol (EAP) message exchange are used between a session management and gateway entity and the mobile management entity.

21. The non-transitory computer-readable storage medium of claim 20, wherein determining to use the second authentication method rather than the first authentication method is based on at least one of: an agreement with the AAA server, at least one parameter comprised in the create session request, a local configuration of whether the second authentication method should be used, capability of the AAA server, or capability of the terminal device.

22. The non-transitory computer-readable storage medium of claim 21, wherein the agreement with the AAA server comprises an agreement with the AAA server for a specific data network name (DNN) or single network slice selection assistance information (S-NSSAI).

* * * * *